US012379882B2

(12) United States Patent
Aizawa

(10) Patent No.: US 12,379,882 B2
(45) Date of Patent: Aug. 5, 2025

(54) IMAGE PROCESSING APPARATUS THAT DETECTS ERROR AND PROVIDES UNIFORM RESOURCE LOCATOR (URL) INFORMATION TO INFORMATION PROCESSING APPARATUS TO ACCESS WEBPAGE FOR CHANGING SETTINGS RELATED TO THE ERROR, AND NON-TRANSITORY COMPUTER READABLE STORAGE MEDIUM

(71) Applicant: CANON KABUSHIKI KAISHA, Tokyo (JP)

(72) Inventor: Yo Aizawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/532,197

(22) Filed: Dec. 7, 2023

(65) Prior Publication Data

US 2024/0192903 A1   Jun. 13, 2024

(30) Foreign Application Priority Data

Dec. 12, 2022   (JP) .................................. 2022-198256

(51) Int. Cl.
*G06F 3/12*     (2006.01)
*H04L 67/146*   (2022.01)
*H04N 1/00*     (2006.01)

(52) U.S. Cl.
CPC ............ *G06F 3/121* (2013.01); *G06F 3/1204* (2013.01); *G06F 3/1234* (2013.01); *G06F 3/1287* (2013.01); *H04L 67/146* (2013.01); *G06F 3/1255* (2013.01); *H04N 1/00962* (2013.01)

(58) Field of Classification Search
None
See application file for complete search history.

(56) References Cited

U.S. PATENT DOCUMENTS 8,953,196 B2 *   2/2015   Matsuura ........... H04N 1/00244
                                                            358/1.15
2010/0208301 A1 *   8/2010   Zenju ...................... H04L 61/50
                                                            358/1.15

(Continued)

FOREIGN PATENT DOCUMENTS

JP   2008124648 A   5/2008
JP   2015109025 A   6/2015

*Primary Examiner* — Haris Sabah
(74) *Attorney, Agent, or Firm* — ROSSI, KIMMS & McDOWELL LLP

(57) ABSTRACT

An information processing system including an image processing apparatus configured to perform processing on an image, and an information processing apparatus that is held by a user, wherein the information processing system comprises: an error detection unit configured to detect an error while processing is being executed for the image processing apparatus; a URL information generating unit configured to generate URL information for a webpage for performing changes to settings related to the error; a URL information providing unit configured to provide the URL information to the information processing apparatus; and a settings changing unit configured to access the webpage on the information processing apparatus from the URL information and change the settings related to the error.

9 Claims, 18 Drawing Sheets

(56) References Cited

U.S. PATENT DOCUMENTS

| | | | |
|---|---|---|---|
| 2014/0153040 A1* | 6/2014 | Yun | H04N 1/00244 358/1.15 |
| 2015/0163373 A1 | 6/2015 | Monden | |
| 2018/0088872 A1* | 3/2018 | Nishimura | G06F 3/1285 |
| 2018/0285025 A1* | 10/2018 | Mizutani | G06F 3/1235 |
| 2019/0073164 A1* | 3/2019 | Yamasaki | G06F 3/1256 |
| 2022/0317939 A1* | 10/2022 | Okuno | G06F 3/1229 |
| 2023/0195397 A1* | 6/2023 | Kado | G06K 19/06037 715/705 |

* cited by examiner

IMAGE PROCESSING APPARATUS THAT DETECTS ERROR AND PROVIDES UNIFORM RESOURCE LOCATOR (URL) INFORMATION TO INFORMATION PROCESSING APPARATUS TO ACCESS WEBPAGE FOR CHANGING SETTINGS RELATED TO THE ERROR, AND NON-TRANSITORY COMPUTER READABLE STORAGE MEDIUM

BACKGROUND OF THE INVENTION

Field of the Invention

The present invention relates to an information processing system, and a control method for an information processing system and storage medium.

Description of the Related Art

When jobs such as scanning, printing, or the like are executed in an image processing apparatus, there are cases in which errors occur due to the settings. In addition, there are also cases in which the functions of the image capturing apparatus are extended by cooperation with an external apparatus, and in accordance with this, it is necessary to set not just the image processing apparatus, but to also set the cooperating external apparatus. There are also cases in which due to this, errors occur because of the settings for the external apparatus.

Conventionally, when such an error occurs, a help screen that provides methods for solving the error, or the like is displayed on a screen of the image processing apparatus. However, the display on the screen of the image capturing apparatus is small, and there are cases in which it is difficult to perform operations to change the settings in situations in which it is difficult to understand the solution, or when performing the solution.

In addition, authorization is necessary when accessing a cloud service from an image processing apparatus, and there are cases in which an error occurs because there is no authorization access token. In such a case, there are cases in which even if the apparatus attempts to display an authorization screen from a web browser of the image processing apparatus in order to perform authorization again, web pages that have been created by third parties cannot be properly displayed, and the settings cannot be performed. WEB is an abbreviation of World Wide Web. In this manner, there are cases in which settings cannot be performed from the image processing apparatus, and errors cannot be resolved. In such a case, it is necessary to access the settings site from an information device such as a PC or the like, and it takes time for the user to move to where the PC is located. PC is an abbreviation of Personal Computer. In relation to this, Japanese Patent Application No. 2008-124648, and Japanese Patent Application No. 2015-109025 displays the help screen by using a mobile terminal such as a smartphone or the like.

However, although in Japanese Patent Application No. 2008-124648, a mobile terminal displays a help screen, it is necessary for the user to perform the settings changes and the like for the image processing apparatus using this help screen in order to resolve the error.

In addition, in Japanese Patent Application No. 2015-109025, buttons for setting changes in which the solution has been defined in advance for each error are prepared, and this is displayed on the screen of a mobile terminal, and the apparatus attempts to resolve errors by making the defined changes to the settings when these buttons are pressed. However, in recent years it has become more common to use authorization or the like to cooperate with external services from other companies, and in Japanese Patent Application No. 2015-109025, it is not possible to define changes in advance for settings items that are not under the management of your own company.

Therefore, conventionally, there has been room for improvement in how errors are handled for image processing apparatuses.

SUMMARY OF THE INVENTION

The present invention takes into account the above-described problems, and aims to improve how errors are dealt with in image processing apparatuses.

The information processing system according to one embodiment of the present invention is an information processing system including an image processing apparatus configured to perform processing on an image, and an information processing apparatus that is held by a user, wherein the information processing system comprises: an error detection unit configured to detect an error while processing is being executed for the image processing apparatus; a URL information generating unit configured to generate URL information for a webpage for performing changes to settings related to the error; a URL information providing unit configured to provide the URL information to the information processing apparatus; and a settings changing unit configured to access the webpage on the information processing apparatus from the URL information and change the settings related to the error.

Further features of the present invention will become apparent from the following description of exemplary embodiments with reference to the attached drawings.

DESCRIPTION OF THE EMBODIMENTS

Below, embodiments for implementing the invention of the present application will be explained using the figures. Note that the following embodiments do not limit the inventions according to the claims, and the essential elements for solving the problem of the invention are not limited to the entire combination of the features that are explained in the embodiments.

In the present embodiment, when an error occurs in an image processing apparatus, it is made possible to perform changes to the settings from a web browser of a mobile terminal such as a smartphone or the like. It is thereby not necessary for the user to move to a location with a PC, and makes it such that they can perform changes to the settings items that correspond to the error on the spot.

According to the present invention, a mobile terminal accesses a webpage for changing settings using URL information that has been obtained from an image processing apparatus. The user thereby does not need to search for the settings item to be changed, and it becomes possible to change the settings without needing to move from the location where the task is taking place. Therefore, the burden on the user when handling an error that has occurred is decreased according to the present invention. URL is an abbreviation of Uniform Resource Locator.

First Embodiment

Below, the First Embodiment of the present invention will be explained. In the First Embodiment, an example of a usage case is explained in which an image that was scanned using an MFP is transmitted to an MFP cooperation service, wherein the MFP cooperation service has a connector for accessing a plurality of cloud services, and the scanned image is transmitted to and saved on a cloud service. MFP is an abbreviation of Multifunction Peripheral. In addition, accessing the cloud services from the MFP cooperation service is executed according to an authority authorization standard referred to as OAuth.

System Configuration

Figure 1:
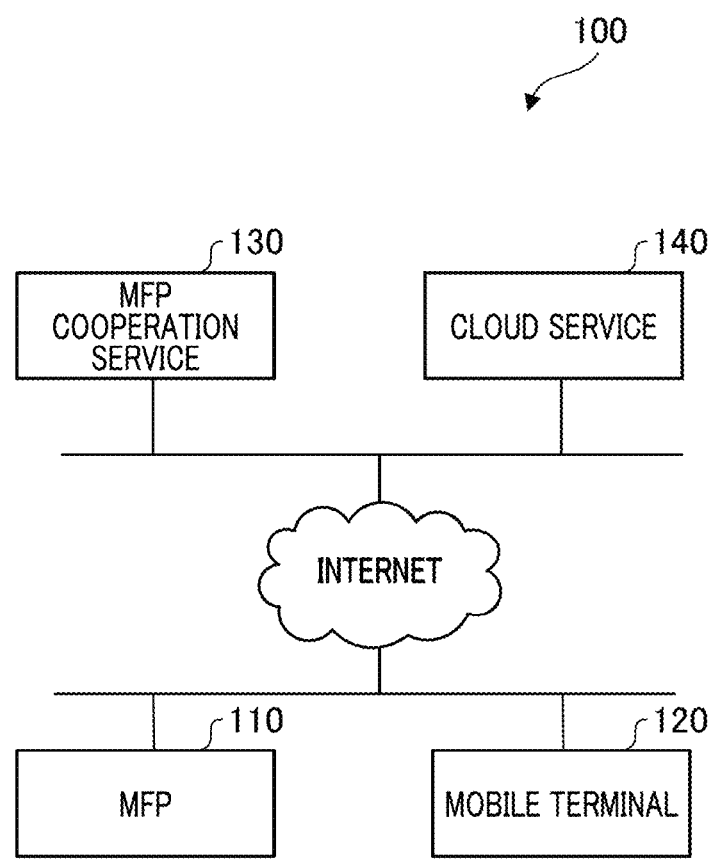
FIG. 1 is a diagram showing an overall configuration for an information processing system according to a First Embodiment of the present invention.

FIG. 1 is a diagram showing the configuration for the entirety of the information processing system according to the First Embodiment of the present application. An information processing system 100 includes an MFP 110, a mobile terminal 120, an MFP cooperation service 130, and a cloud service 140.

The MFP 110 and the mobile terminal 120 are communicably connected to each type of apparatus that provides each type of service on the internet via a LAN. LAN is an abbreviation of Local Area Network. Note that the mobile terminal 120 may also be connected to the internet via a mobile communication network.

The MFP 110 is a multifunction peripheral having a plurality of functions such as scanning and printing, and is one example of an image processing apparatus. The mobile terminal 120 is an information processing apparatus that is able to access a webpage on which settings are performed for the MFP 110 and the MFP cooperation service 130 via a web browser over the internet. The user carries the mobile terminal 120.

The MFP cooperation service 130 is one example of a service having functions to performs image analysis on a scanned image that has been received from an MFP 110, and to transmit requests from the MFP 110 to other services. The MFP cooperation service 130 consists of, for example, an information processing apparatus or the like that realizes a service by executing a program.

The cloud service 140 is a cloud service for performing cloud storage and document management, and is also a service that is able to store files via the internet, and to acquire files on a web browser. The cloud service 140 consists of, for example, an information processing apparatus or the like that realizes a service by executing a program.

Although the information processing system 100 of the present embodiment has a configuration that consists of the MFP 110, the mobile terminal 120, the MFP cooperation service 130, and the cloud service 140, the present invention is not limited thereto. For example, the MFP 110 may also be provided with the role of the MFP cooperation service 130. In addition, the MFP cooperation service 130 may also be disposed on a LAN instead of on the internet.

<Hardware Configuration for the MFP>

Figure 2:
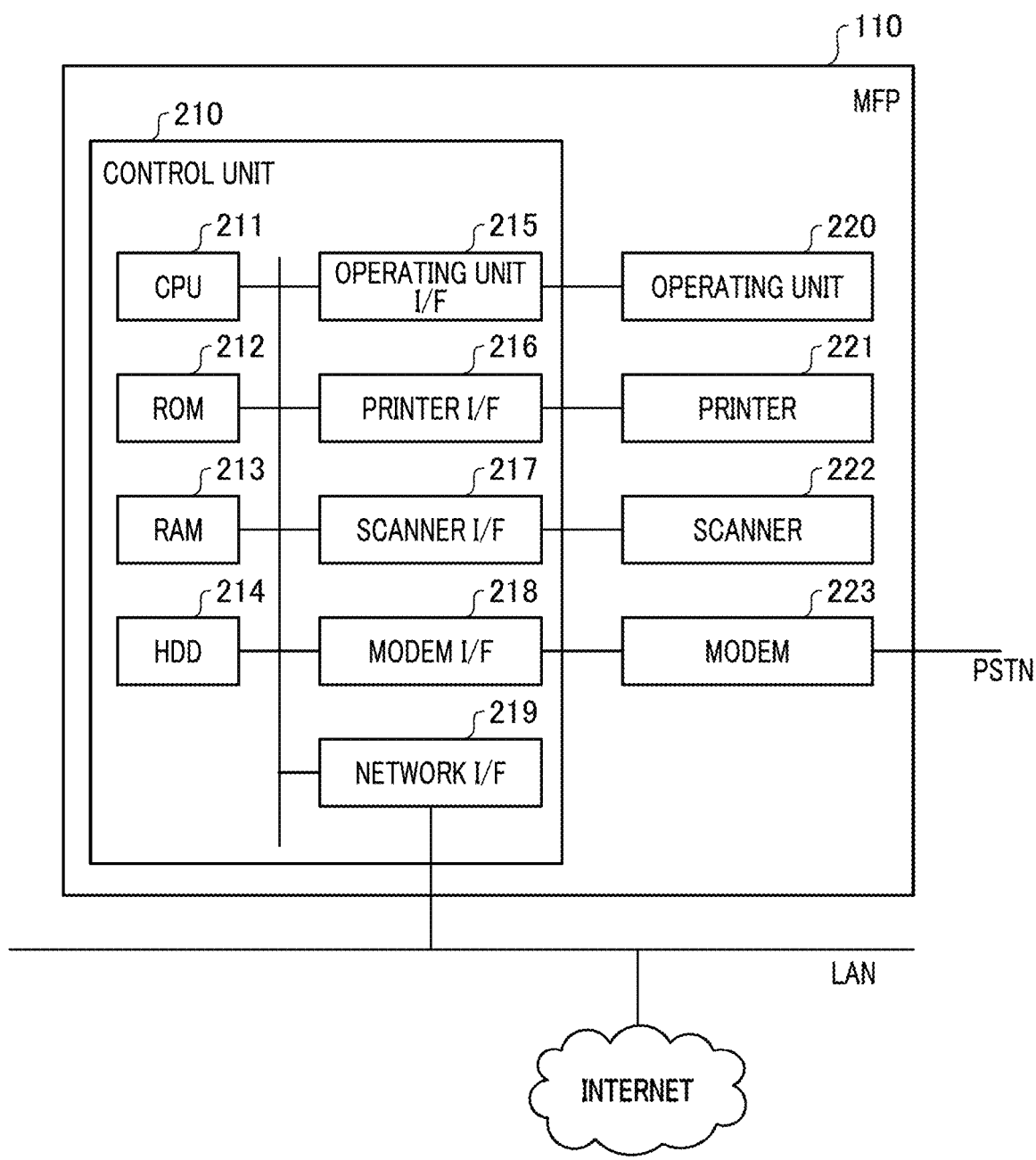
FIG. 2 is a hardware configuration diagram for an MFP according to the First Embodiment.

FIG. 2 is a hardware configuration diagram for the MFP 110. The MFP 110 has a control unit 210, an operating unit 220, a printer unit 221, a scanner unit 222, and a modem 223.

The control unit 210 controls the entirety of the operations of the MFP 110. The control unit 210 has a CPU 211, a ROM 212, a RAM 213, and an HDD 214. CPU is an abbreviation of Central Processing Unit. ROM is an abbreviation of Read Only Memory. RAM is an abbreviation of Random Access Memory. HDD is an abbreviation of Hard Disk Drive. The control unit 210 also has an operating unit I/F 215, a printer I/F 216, a scanner I/F 217, a modem I/F 218, and a network I/F 219. I/F is an abbreviation of Interface.

The CPU 211 reads out a control program that has been stored on the ROM 212 and executes and controls each type of function had by the MFP 110 such as reading/printing/communications, or the like. The RAM 213 is used as a temporary storage area such as the main memory, the work area, or the like of the CPU 211. Note that in the present embodiment, it is assumed that one CPU 211 uses one memory (the RAM 213 or the HDD 214) to execute each type of processing, however, the present invention is not limited thereto. For example, each processing may also be executed by having a plurality of CPUs and a plurality of RAMs or HDDs cooperate. The HDD 214 is a large capacity storage unit that stores image data and each type of program.

The operating unit I/F 215 is an interface that connects the operating unit 220 and the control unit 210. The operating unit 220 is provided with a touch panel, a keyboard, or the like, and receives operations/inputs/commands from a user.

The printer I/F 216 is an interface that connects the printer unit 221 and the control unit 210. Image data for use in printing is transferred to the printer unit 221 from the control unit 210 via the printer I/F 216, and is printed on a recording medium.

The scanner I/F 217 is an interface that connects the scanner unit 222 and the control unit 210. The scanner unit 222 generates scanned image data by reading an original document that has been set on a document tray, an ADF, or the like, and inputs this to the control unit 210 via the scanner I/F 217. ADF is an abbreviation of Auto Document Feeder.

The MFP 110 is able to perform file transmission and mail transmission in addition to performing print output (copying) from the printer unit 221 of image data that has been generated by the scanner unit 222.

The modem I/F 218 is an interface that connects the modem 223 and the control unit 210. The modem 223 communicates a fax of image data between fax machines on a PSTN. PSTN is an abbreviation of Public Switched Telephone Network.

The network I/F 219 is an interface that connects the control unit 210 (the MFP 110) to a LAN. The MFP 110 uses the network I/F 219 to transmit image data and information to each service on a network, and to receive each type of information.

The hardware for the MFP 110 that has been described above is one example, and may also be provided with other configurations according to necessity, or may also have just a portion of this configuration.

<Hardware Configuration for the Mobile Terminal>

Figure 3:
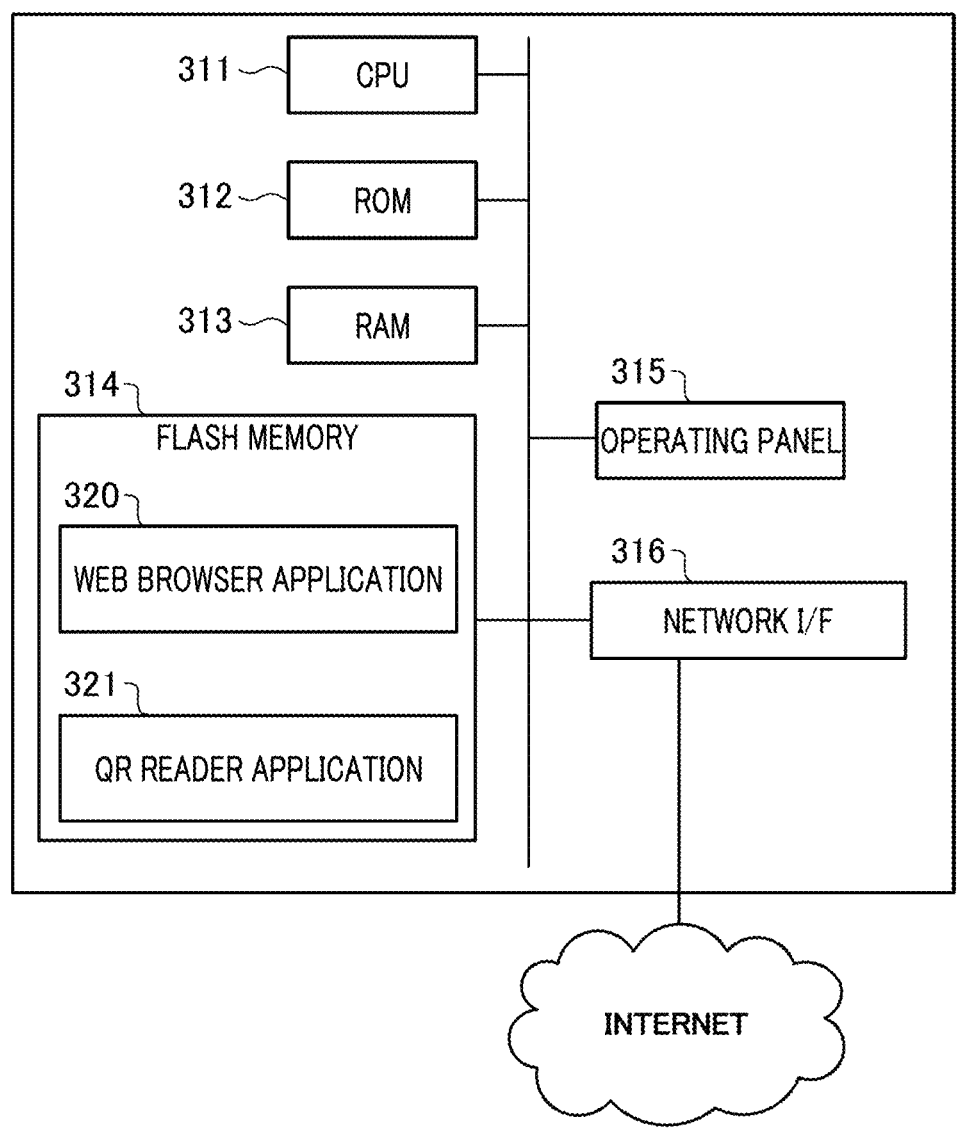
FIG. 3 is a hardware configuration diagram for a mobile terminal according to the First Embodiment.

FIG. 3 is a hardware configuration diagram for the mobile terminal 120. The mobile terminal 120 has a CPU 311, a ROM 312, a RAM 313, a flash memory 314, an operating panel 315, and a network I/F 316.

The CPU 311 controls the entirety of the operations by reading out a program that has been stored on at least one of the ROM 312 or the flash memory 314, and executing each type of processing. The RAM 313 is used as a temporary storage area such as a main memory, a working area, or the like of the CPU 311.

The flash memory 314 is a non-volatile storage medium, and stores the program that is executed by the CPU 311, and each type of data. Each type of program that is executed by the CPU 311 includes a web browser application 320 that has the function of acquiring web contents, and displaying these on a screen through communication with an arbitrary server. Each type of program that is executed by the CPU 311 also includes a QR code reader application 321 for reading a QR code (registered trademark), which is a 2-dimensional code that includes information. In the present embodiment, the flash memory 314 stores the web browser application 320 and the QR code reader application 321.

The operating panel 315 performs display of an internal state of the mobile terminal 120, and a display screen for an application that is installed on the mobile terminal 120. In addition, the operating panel 315 receives operations/inputs/commands from the user by the user touching the touch panel of the operating panel 315 when they are performing each type of operation.

Figure 4:
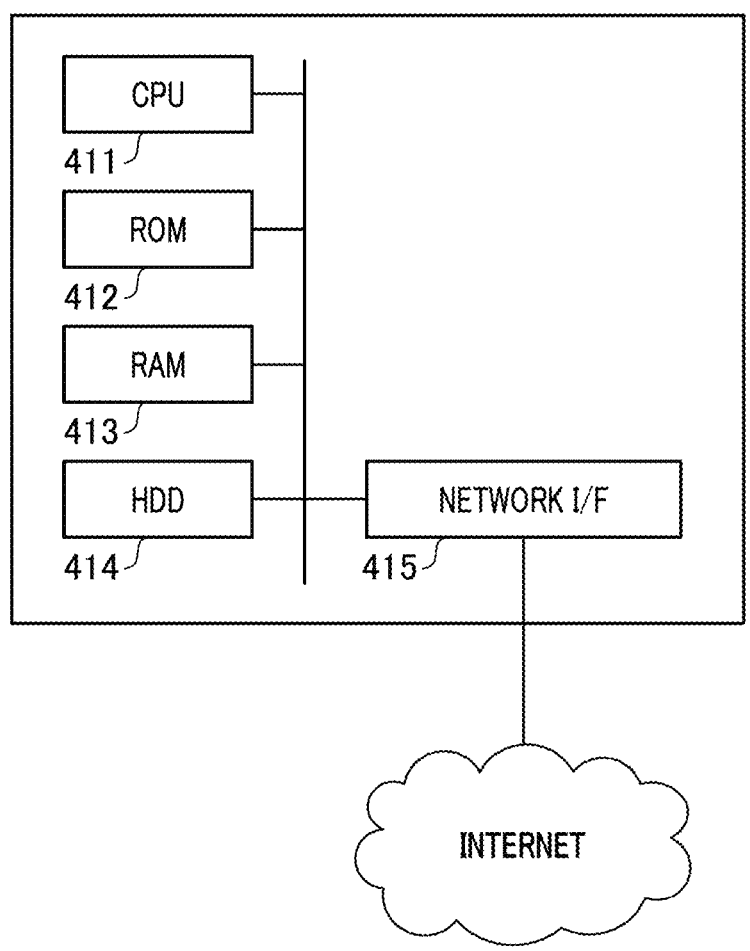
FIG. 4 is a hardware configuration diagram for an MFP cooperation service according to the First Embodiment.

The network I/F 316 is an interface for performing communication between the MFP 110 and the MFP cooperation service 130 by connecting the network I/F 219 of the MFP 110, and the network I/F 415 of the MFP cooperation service 130 (refer to FIG. 4). Note that it is assumed that the communication between the mobile terminal 120, the MFP 110, and the MFP cooperation service 130 is realized by a wireless communication system that uses wireless LAN or the like, and the communication is performed via a LAN and the internet. However, the present invention is not limited to communication using a specific standard, and can communicate using an arbitrary standard.

<Hardware Configuration for the MFP Cooperation Service>

FIG. 4 is a hardware configuration diagram for the MFP cooperation service 130. The MFP cooperation service 130 has a CPU 411, a ROM 412, a RAM 413, an HDD 414, and a network I/F 415.

The CPU 411 controls the entirety of operations by reading out a control program that has been stored on the ROM 412, and executing each type of processing. The RAM 413 is used as a temporary storage area such as a main memory for the CPU 411, a working area, or the like. The HDD 414 is a large volume storage unit that stores image data and each type of program.

The network I/F 415 is an interface that connects the MFP cooperation service 130 to the internet. The MFP cooperation service 130 receives processing requests from other apparatuses (the MFP 110, and the like) and sends and receives each type of information via the network I/F 415.

<Software Configuration for the Information Processing System>

Figure 5:
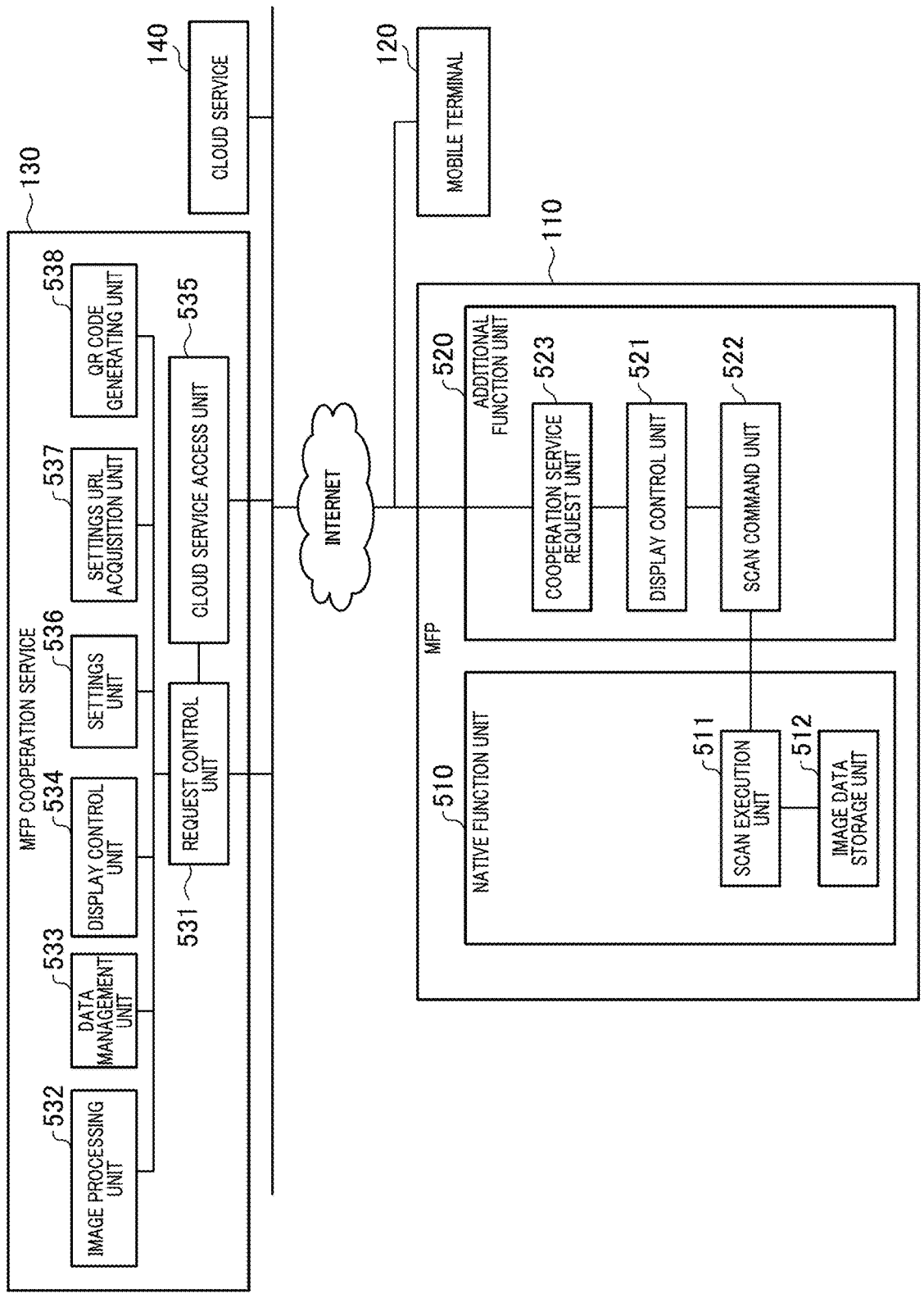
FIG. 5 is a software configuration diagram for a system according to the First Embodiment.

FIG. 5 is a software configuration diagram for the information processing system 100 according to the First Embodiment. The MFP 110 can largely be divided into two units, a native function unit 510, and an additional function unit 520. Each unit that is included in the native function unit 510 is standardly provided to the MFP 110, whereas the additional function unit 520 is an application that has been additionally installed on the MFP 110. The additional function unit 520 is an application that uses Java (registered trademark) as its base and is able to easily realize the addition of functions to the MFP 110. Note that other additional applications that are not shown may also be installed on the MFP 110.

The native function unit 510 has a scan execution unit 511 and an image data storage unit 512. The additional function unit 520 has a display control unit 521, a scan command unit 522, and a cooperation service request unit 523.

The display control unit 521 displays a UI screen for receiving operations from the user on a liquid crystal display unit that has the functions of a touch panel for the operating unit 220 of the MFP 110. UI is an abbreviation of User Interface. For example, the display control unit 521 displays a UI screen for inputting authentication information for access the MFP cooperation service 130, an operation to begin a scan, a preview screen, or the like. The scan command unit 522 requests scan settings according to a user command that was input via the UI screen and scan processing to the scan execution unit 511.

The scan execution unit 511 receives scan requests including scan settings from the scan command unit 522. The scan execution unit 511 generates scanned image data by reading an original document that has been placed on the original document tray glass using the scanner unit 222 via the scanner I/F 217 according to a scan request. The scanned image data that has been generated is sent to the image data storage unit 512. The scan execution unit 511 sends a scanned image identifier to the scan command unit 522. A scanned image identifier is an identifier for uniquely indicating scanned image data that has been stored. A scanned image identifier is a number, a code, letters, or the like for uniquely identifying an image that has been scanned in the MFP 110. The image data storage unit 512 stores scanned image data that has been received from the scan execution unit 511 on the HDD 214.

The scan command unit 522 acquires the scanned image data corresponding to the scanned image identifier that was received from the scan execution unit 511 from the image data storage unit 512. The scan command unit 522 requests a command to perform processing on the acquired scan data in the MFP cooperation service 130 from the cooperation service request unit 523.

The cooperation service request unit 523 performs a request for each type of processing to the MFP cooperation service 130. For example, the cooperation service request unit 523 performs requests for logging in, analysis of a scanned image, transmitting a scanned image, or the like. Exchanges between the MFP 110 and the MFP cooperation service 130 use a protocol such as REST, SOAP, or the like. However, other communication unit may also be used. REST is an abbreviation of Representational State Transfer. SOAP is an abbreviation of Simple Objective Access Protocol.

The MFP cooperation service 130 has a request control unit 531, an image processing unit 532, a data management unit 533, a display control unit 534, a cloud service access unit 535, a settings unit 536, a settings URL acquisition unit 537, and a QR code generating unit 538.

The request control unit 531 is on standby in a state in which it can receive requests from an external unit. Upon receiving a processing request, the request control unit 531 appropriately sends processing commands to the image processing unit 532, the data management unit 533, the display control unit 534, the cloud service access unit 535, the settings unit 536, the settings URL acquisition unit 537, and the QR code generating unit 538 according to the request.

The image processing unit 532 performs character region analysis processing on images, character recognition processing on the character region that has been analyzed, and identification processing as well as image editing processing on images such as rotating an image or correcting the gradient. Below, character recognition processing will be referred to as OCR. OCR is an abbreviation of Optical Character Recognition. The MFP cooperation service 130 may also transmit an image to the cloud service 140 after performing image editing processing and the like on a scanned image that has been received from the MFP 110 using the image processing unit 532.

The data management unit 533 stores each type of settings data such as user information that is managed in the MFP cooperation service 130, authorization information for accessing the cloud service 140, and the like.

The display control unit 534 returns screen configuration information (HTML, CSS, or the like) that is necessary to display a screen after receiving a request from a web browser that is operating on the mobile terminal 120 or a PC terminal (not shown) that have been connected via the internet. HTML is an abbreviation of HyperText Markup Language. CSS is an abbreviation of Cascading Style Sheets. The user confirms the user information that is registered on the MFP cooperation service 130 via a screen that is displayed on the web browser, and changes the settings for when a scan is performed and the settings for accessing the cloud service 140.

The cloud service unit 535 performs a request for processing to the cloud service 140. The cloud service 140 generally makes a variety of interfaces available to the public for storing files on the cloud service 140 and acquiring stored files using a protocol such as REST, SOAP, or the like. The cloud service access unit 535 performs operations for the cloud service 140 using an interface of the cloud service 140 that has been made available to the public. In addition, the cloud service access unit 535 performs to access to the cloud service 140 by authorization using OAuth.

The settings unit 536 performs settings such as settings for scanning, settings for authorization, and the like. The settings can be changed from a web browser of the mobile terminal 120 or a PC terminal via the display control unit 534.

The settings URL acquisition unit 537 performs the acquisition of a URL for a page for a settings site corresponding to the settings for each of the functions in the settings unit 536. In the present embodiment, when an error occurs in the MFP cooperation service 130, the settings URL acquisition unit 537 acquires a URL for the settings page corresponding to this error.

The QR code generating unit 538 generates a QR code from the URL.

<Entire Processing Flow>

Figure 6:
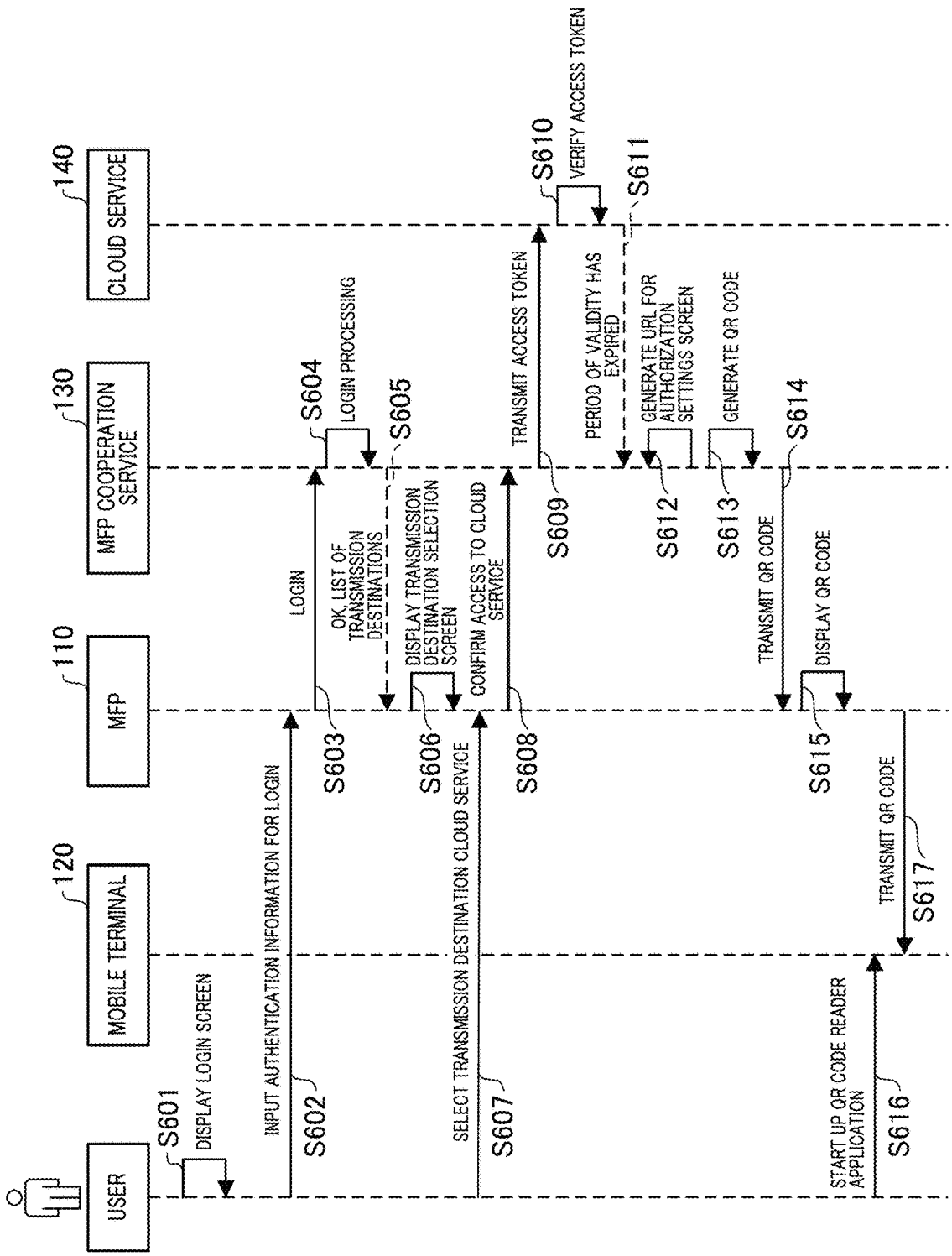
FIG. 6 is a sequence diagram for the entirety of the system according to the First Embodiment.
Figure 7:
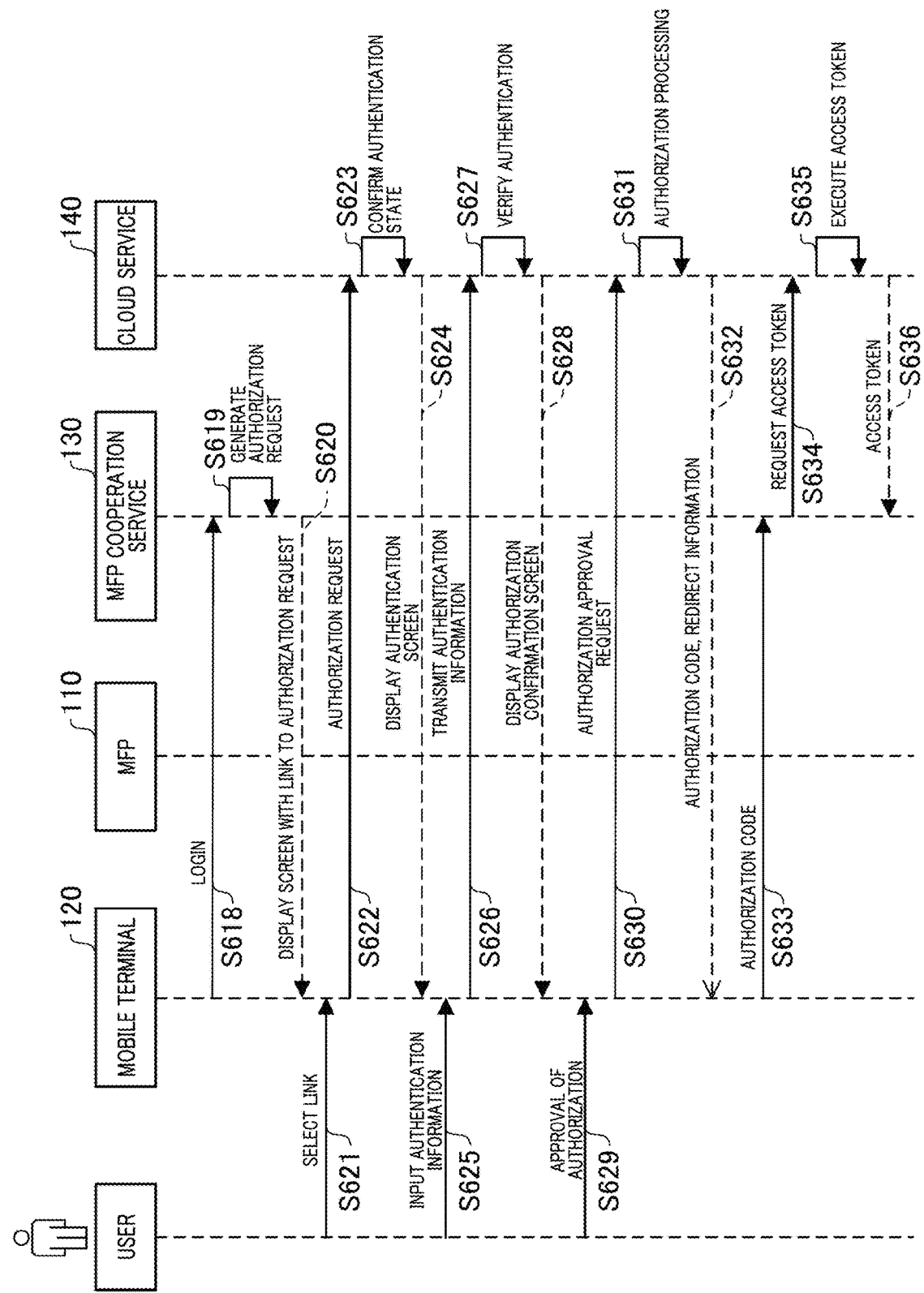
FIG. 7 follows the diagram in FIG. 6 and is a sequence diagram for the entirety of the system according to the First Embodiment.

FIG. 6 and FIG. 7 are sequence diagrams for performing re-authorization for a case in which the period of validity for the authorization has expired and an error has occurred when an image that was scanned by the MFP 110 was being turned into a file and transmitted to the cloud service 140. In this context, an explanation will be given that focuses on the exchanges between each apparatus.

The MFP 110 displays a main screen on which buttons for executing each function that is provided in a normal state are lined up on the touch panel.

By installing an additional application (referred to hereinafter as a scan application) on the MFP 110 for transmitting a scanned image to a cloud service, a button for using the function of the application is displayed on the main screen of the MFP 110. If this button is pressed, a screen is displayed for transmitting an image that has been scanned to the cloud service 140, and the processing that is shown in the sequences in FIG. 6 and FIG. 7 is performed.

During step S601, the scan application displays a login screen on which authentication information is input in order to access the MFP cooperation service 130. During step S602, the scan application receives the input of authentication information by the user. During step S603, the scan application transmits the authentication information to the MFP cooperation service 130.

During step S604, the MFP cooperation service 130 executes login processing. Specifically, the MFP cooperation service 130, verifies whether the username and password that are included in the login request are correct, and if they are correct, returns an access token to the MFP 110. Subsequently, for each type of request that is performed to the MFP cooperation service 130 from the MFP 110, a request is output together with this access token, and the user who is the processing target can be specified using this information. The method for the user authentication is performed using a general well-known method (basic authentication, digest authentication, authorization using OAuth, or the like).

After the login processing has been completed, during step S605, the MFP cooperation service 130 transmits, to the MFP 110, a login successful message and a transmission destination list for the cloud services to which the MFP cooperation service 130 performs transmission. The MFP 110 receives the login successful message and the list of transmission destination cloud services. During step S606, the MFP 110 displays a transmission selection screen that includes the list of transmission destination cloud services.

Figure 8:
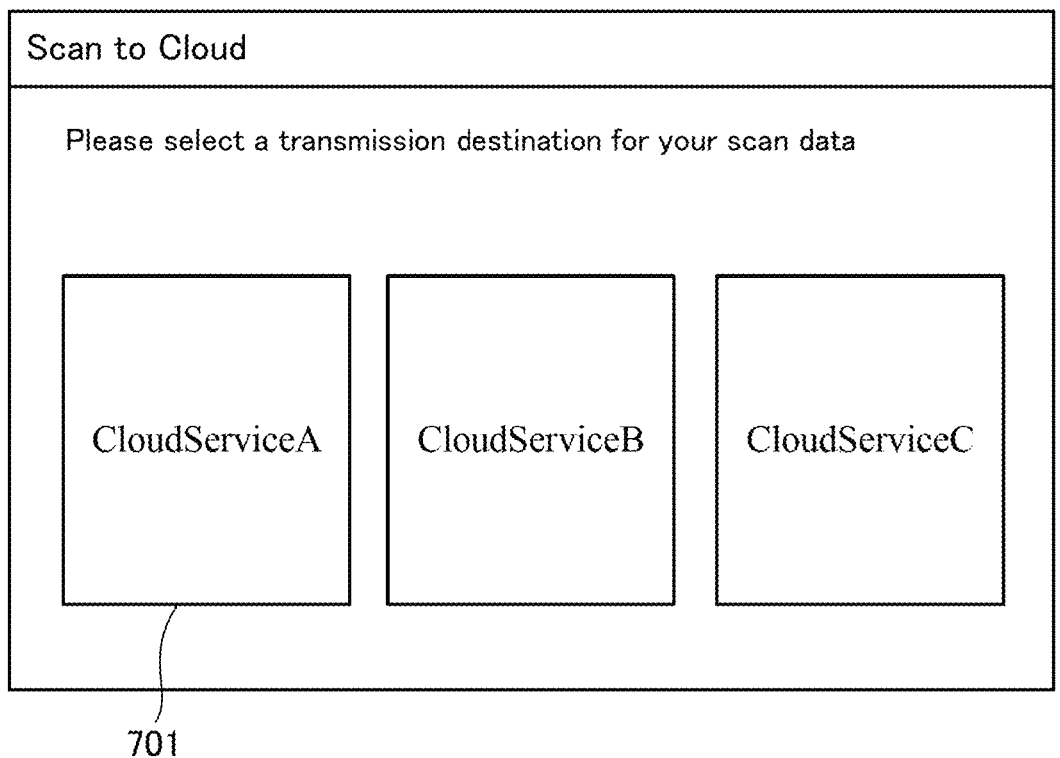
FIG. 8 is one example of a selection screen for a transmission destination cloud in the First Embodiment.

FIG. 8 is one example of a selection screen for the transmission destination clouds that is displayed in the screen of the MFP 110 during step S606 of FIG. 6. The selection screen for the transmission destination cloud service displays a transmission destination button 701. The transmission destination button 701 is a button for indicating the transmission destination cloud service to which the scanned image will be transmitted. During step S607, the MFP 110 receives the selection of the transmission destination button 701 corresponding to the cloud service to which the user would like to perform transmission.

During step S608, the MFP 110 transmits a request to confirm whether it is possible for the MFP cooperation service 130 to access the cloud service is 140. During step S609, the MFP cooperation service 130 transmits an access token that is used in OAuth to the cloud service 140. During step S610, the cloud service 140 verifies whether the access token that has been received is valid. Access tokens have periods of validity, wherein access tokens for which the period has expired are made invalid, and during step S611, a message is returned to the MFP cooperation service 130 from the cloud service 140. The processing for step S610 is one example of an error detection unit configured to detect an error while processing is being executed for an image processing apparatus.

In addition, during step S610, in a case in which the access token is valid, after scanning is performed in the MFP 110, the scanned image is transmitted to the MFP cooperation service 130. In addition, the MFP cooperation service 130 accesses the cloud service 140 using the valid access token and stores the scanned image, and the job is completed normally.

In addition, during step S610, when the period of validity for the access token has expired, in a case in which a refresh token for updating the access token has been prepared, there are cases in which the access token is updated. In a case in which the refresh token is valid, the access token is updated, and after the scanning is performed in the MFP 110, the scanned image is transmitted to the MFP cooperation service 130. In addition, the MFP cooperation service 130 accesses the cloud service 140 using the updated access token and saves the scanned images, and the job is finished normally. In a case in which the period of validity for the refresh token has expired, it is not possible to update the access token, and therefore, the processing for step S611 that was explained above is executed.

When the period of validity for the access token has expired, following the processing for step S611, the processing for step S612 is executed. During step S612, the MFP cooperation service 130 generates a URL for a webpage for performing the settings in order to be re-authorized by the cloud service 140. The MFP cooperation service 130 outputs an error code corresponding to a case when there is no valid access token. The settings URL acquisition unit 537 acquires the URL for the webpage relating to the authorization settings for the cloud service for the settings unit 536 based on this error code.

The settings URL acquisition unit 537 acquires a URL such as, for example, "https://example.com/OAuthRequest/CloudServiceA". This example URL is a URL for a webpage for performing the OAuth settings for a CloudServiceA when "CloudServiceA" has been selected for the transmission destination button 701. The FQDN (Fully Qualified Domain Name) for the MFP cooperation service 130 is "example.com". The pass for the settings webpage for OAuth for the CloudServiceA is "OAuthRequest/CloudServiceA". Although it is not disclosed in this example, the port number for the cloud service that is the connection destination may also be included in this URL. In addition, query parameters may also be added such that the user can easily perform the settings. An example in which query parameters are used will be explained below.

During step S613, the QR code generating unit 538 generates a QR code from the URL from step S612. The processing in step S612 and step S613 are one example of a URL information generating unit configured to generate URL information for a webpage for performing changes to settings relating to an error.

During step S614, the MFP cooperation service 130 transmits the QR code to the MFP 110. Next, during step S615, the MFP 110 displays the QR code that was received on the screen. When this happens, the MFP cooperation service 130 also transmits this together with an error message corresponding to the error code, and the MFP 110 displays the received error message. The processing for step S615 is one example of a URL information provision unit configured to provide URL information to an information processing apparatus.

Figure 9:
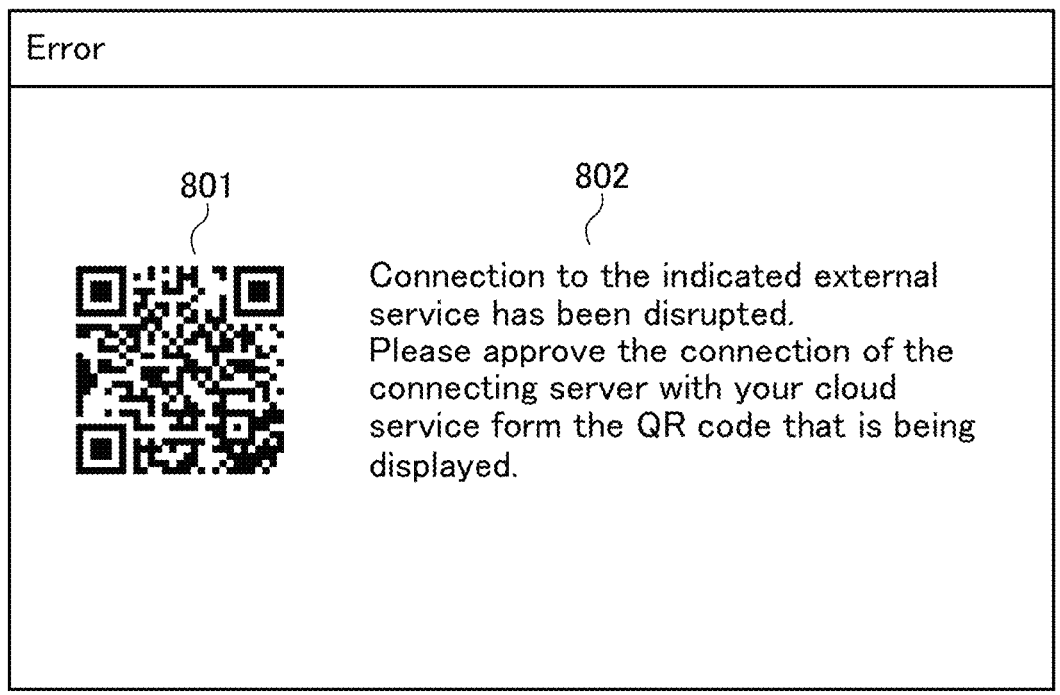
FIG. 9 is one example of a provision method to a mobile terminal for URL information for a settings web page according to the First Embodiment.

FIG. 9 is one example of an error screen that is displayed by the MFP 110 during step S615. The QR code 801 is the QR code that has been received from the MFP cooperation service 130. The error message 802 is the error message that has been received from the MFP cooperation service 130.

During step S616, the mobile terminal 120 starts up the QR code reader application 321 by a user operation. The user reads the QR code 801 that was displayed by the MFP 110 during step S615 using the QR reader application 321 of the mobile terminal 120. During step S617, the QR reader application 321 reads the QR code 801 that is displayed on the MFP 110, and acquires the URL information.

During step S618, the mobile terminal 120 uses the web browser application 320 and accesses the settings page, which is the page that is indicated by the URL that was acquired by the QR reader application 321 during step S617. When this happens, the mobile terminal 120 needs authentication in order to access the MFP cooperation service 130, and therefore it is necessary to input a user ID and password. At this time, it may also be made such that the MFP cooperation service 130 has already completed the input of the items for the user ID by including the information for the user ID with which the user logged in on the MFP 110 during step S603 in the query parameters for the URL in advance. For example, when the user ID "xxxx" is logged into the MFP 110, the URL that is generated during step S612 may be made "https://example.com/OAuthRequest/CloudServiceA?id=xxxx". By doing this, when being accessed from the mobile terminal 120, the MFP cooperation service has already completed the input of "xxxx" for the user ID based on the query parameters. In addition, when a specific value has been sent using query parameters, a portion of the settings items for the webpage may be made to be emphasized in the display, and the settings may be performed in the MFP cooperation service 130 such that it is easy to understand which settings should be performed.

During step S619, after logging in, the MFP cooperation service 130 generates a URL for an authorization request. The URL that is generated is a URL such as "https://cloudservice-a.com/oauth2/auth?response_type=code&client_id=xxxxxxxx&redirect_uri=https://example.com/oauth", and an OAuth authorization request for the CloudService A is generated. The query parameters may also be made a value that differs from this example, and other parameters may also be included according to the OAuth specifications. In addition, the redirect URL of the query parameters indicates the MFP cooperation service 130 such that the authorization code can be transferred from the mobile terminal 120 to the MFP cooperation service 130.

Figure 10:
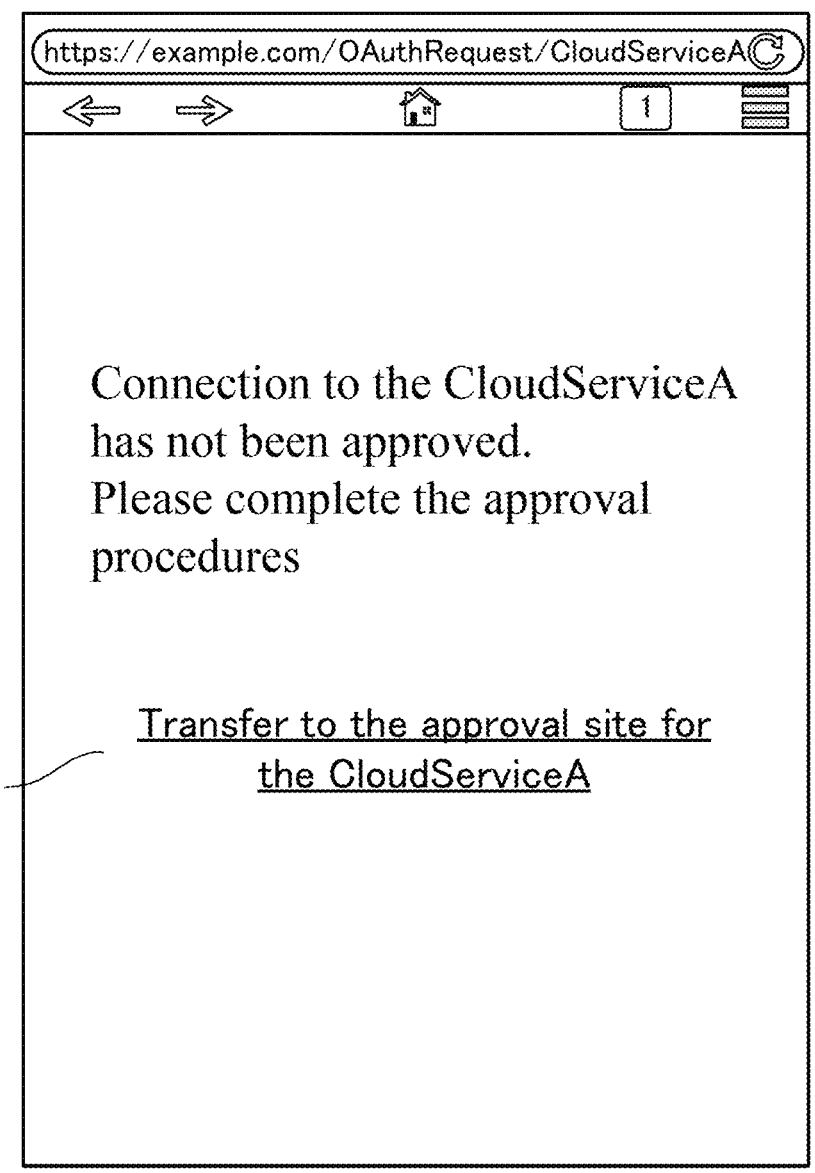
FIG. 10 is one example of a settings web page in the First Embodiment.

During step S620, the MFP cooperation service 130 transmits the URL for the authorization request to the mobile terminal 120, and the mobile terminal 120 displays a screen that sets the OAuth by using the URL for the authorization request that has been received. FIG. 10 is an example of a settings screen that leads to the approval of the authorization to the CloudServiceA in order to perform the OAuth settings for the CloudServiceA. The link 901 for the cloud service that is displayed on the settings screen during step S620 is a link for the authorization request URL that was generated during step S619.

During step S621, the user selects the link 901 to the cloud service 140 that is displayed on the mobile terminal 120.

In the present embodiment, an explanation has been given using an example in which the user is made to select a link during step S621. However, the present invention is not limited thereto, and an authorization request may also be generated during step S619, after logging in during step S618, and a redirecting page may also be displayed during step S620 so as to automatically transition to the authorization request.

Figure 11:
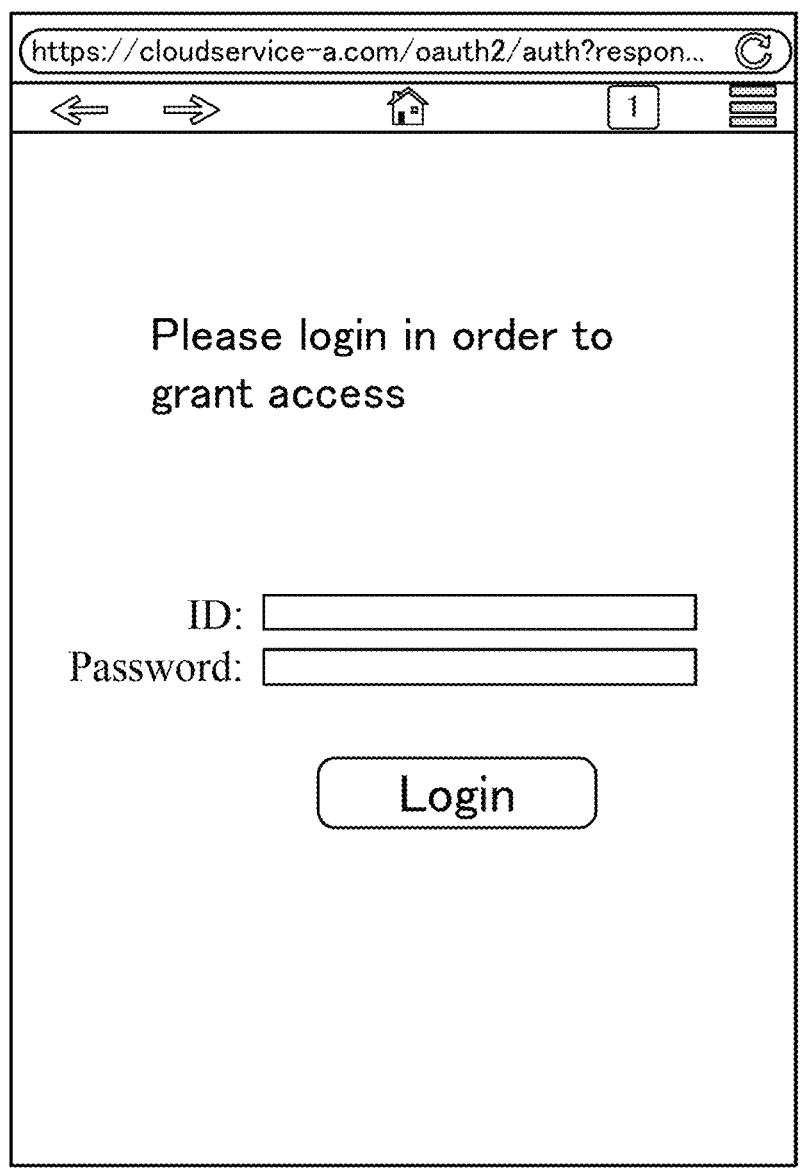
FIG. 11 is one example of an authentication screen for a cloud service according to the First Embodiment.

During step S622, the mobile terminal 120 transmits the authorization request to the cloud service 140 that was selected during step S621. During step S623, the cloud service 140 confirms weather the authentication for the cloud service 140 has already been completed and whether the access is valid based on the information for the web browser's cookies. In a case in which the access was valid during step S623, the cloud service 140 executes the processing from step S628. When access is not possible during step S623, during step S624, the cloud service 140 displays an authentication screen on the mobile terminal 120. FIG. 11 is one example if an authentication screen. This authentication screen requests that a user input the ID and password for an account for the CloudServiceA.

Figure 12:
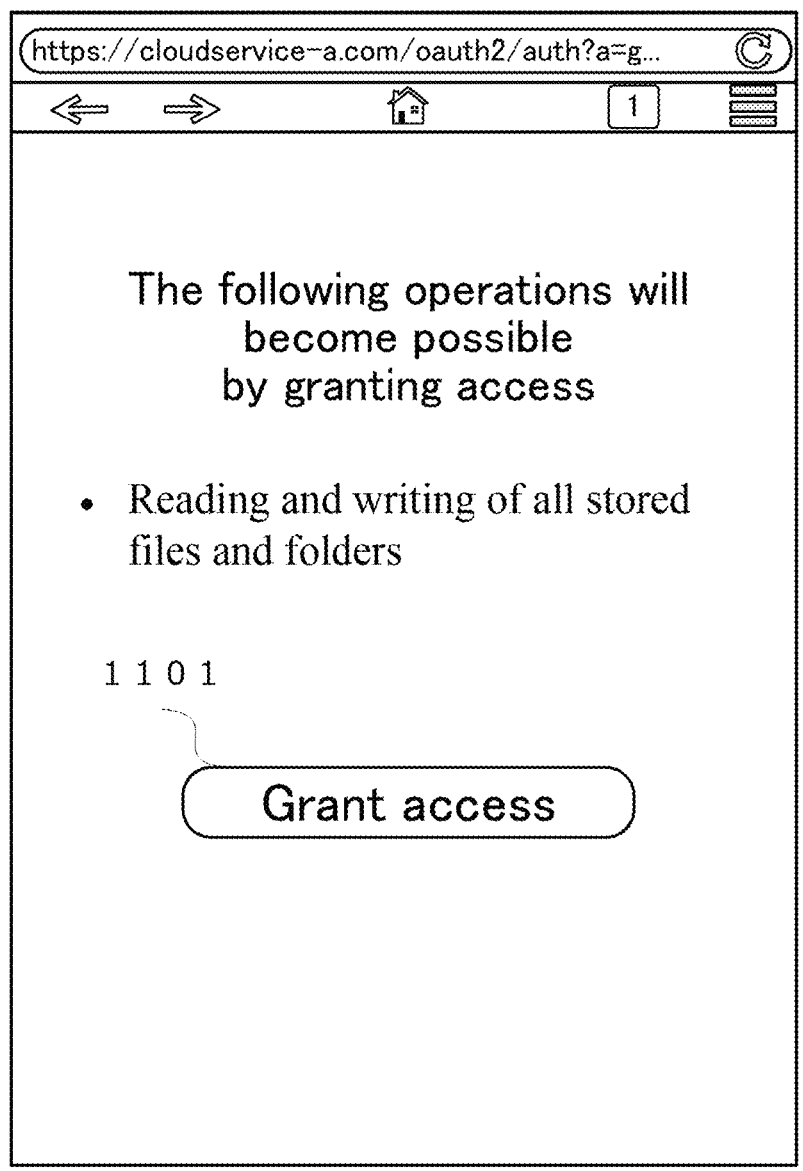
FIG. 12 is one example of an authorization screen for a cloud service according to the First Embodiment.

During step S625, the mobile terminal 120 receives the input of the authentication information such as the ID and password or the like for an account for the CloudServiceA from the user. During step S626, the mobile terminal 120 transmits the authentication information that was input by the user to the cloud service 140. During step S627, the cloud service 140 verifies the authentication information that has been received, and if this is correct, grants access. After the authentication, during step S628, the cloud service 140 displays a license confirmation screen for the authorization on the mobile terminal 120. FIG. 12 is one example of a license screen for the authorization. This license screen for the authorization displays a permission button 1101, which is a button for granting access permission.

During step S629, the mobile terminal 120 receives the selection of the permission button 1101 from the user. If the permission button 1101 has been selected, during step S630, the mobile terminal 120 transmits an approval request for authorization to the cloud service 140. During step S631, the cloud service 140 executes authorization processing. In addition, during step S632, the cloud service 140 transmits the authorization code and the redirect information to the mobile terminal 120. The redirect information is the transfer destination for the authorization code for the MFP cooperation service 130 that was included in the redirect URL for the query parameters in the authorization request during step S619.

During step S633, the mobile terminal 120 transmits the authorization code to the MFP cooperation service 130 based on the redirect information. During step S634, the MFP cooperation service 130 sends a request to the cloud service 140 for the access token using the authorization code. During step S635, the cloud service 140 issues an access token. During step S636, the cloud service 140 transmits the access token to the MFP cooperation service 130. The processing for step S618 to step S636 is one example of a settings changing unit configured to access a web page on an information processing apparatus from the URL information, and change settings relating to an error.

In this manner, according to the present embodiment, it is possible for the user who is operating the MFP 110 to perform settings using the mobile terminal 120 that they have on hand. The user thereby does not have to move from their location, and the settings can be changed from the provided settings page, meaning that this can be completed without searching for the settings item corresponding to the error, and it is possible to lessen the burden on the user when handling an error that has occurred.

In addition, in the present embodiment, an explanation has been given using re-authorization for when the period of validity for the access token as expired. However, the present invention is not limited thereto. For example, when authorization has not yet taken place, in a case in which the MFP cooperation service 130 does not have an access token during step S608, the steps after step S612 may be executed, and initial authorization may be initiated.

In addition, although an explanation has been given in the present embodiment using authorization processing as an example, the present invention is not limited to authorization processing. For example, when an error occurs during the cooperation service with the MFP 110, it can be made possible to change the settings from the mobile terminal 120 by displaying the QR code on the MFP 110.

In addition, although in the present embodiment the URL was provided to the mobile terminal 120 using a QR code, this method is not limited to a QR code as long as the URL can be sent to the mobile terminal 120. For example, it may also be made such that the URL is delivered using the short range radio communications standard NFC (Near Field Communication).

Second Embodiment

In the First Embodiment, an explanation was given with respect to settings changes in a service that cooperates with an MFP that are made by using a mobile terminal. However, the present invention is not limited thereto, and it may also be made such that settings for the MFP itself are made from a mobile terminal, For example, there are cases in which in order to install software and change settings for using a specific function, it is necessary to input the IP address for the MFP into a web browser from a PC, and to access the settings screen.

As a function of an MFP, a function is known that uses OCR character recognition technology on a scanned image to automatically extract character information, and generate a searchable PDF in which this character information is included in a PDF. PDF is an abbreviation of Portable Document Format. In the Second Embodiment, an example will be explained of a case in which the function for generating this searchable PDF is not installed on the MFP and an error occurs when trying to generate a searchable PDF.

Note that the workflow is made the series of processing of performing scanning on the MFP, generating a searchable PDF of the scanned image on the MFP, transmitting the generated PDF to the MFP cooperation service, and then after transmitting this to the cloud service. It is assumed that this workflow is stored on the MFP cooperation service, and that this workflow can be executed by the processing contents being transmitted to the MFP. It thereby becomes possible to execute the same series of processing on other MFPs as well by connecting to the MFP cooperation service.

In addition, the system configuration for the present embodiment, and the hardware configurations for the MFP, the mobile terminal, and the MFP cooperation service are the same as those in the First Embodiment.

<Software Configuration for the Information Processing System>

Figure 13:
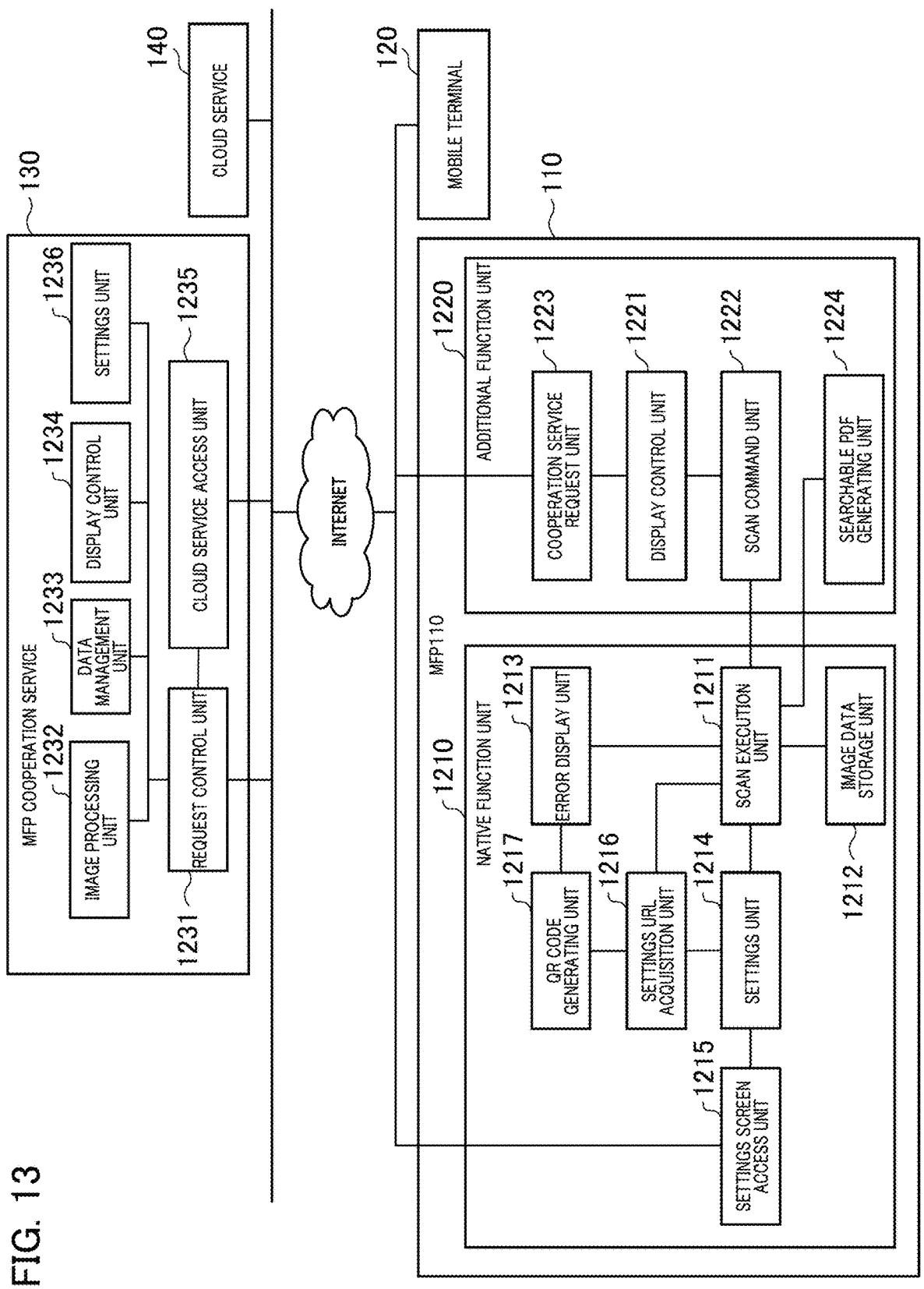
FIG. 13 is a software configuration diagram for a system according to a Second Embodiment.

FIG. 13 is a software configuration diagram for an information processing system according to the Second Embodiment. The MFP 110 can be largely separated into two units, a native function unit 1210 and an additional function unit 1220, in the same manner as the native function unit 510 and the additional function unit 520 of the First Embodiment.

The native function unit 1210 has a scan execution unit 1211, an image data storage unit 1212, an error display unit 1213, a settings unit 1214, a settings screen access unit 1215, a settings URL acquisition unit 1216, and a QR code generating unit 1217. The additional function unit 1220 has a display control unit 1221, a scan command unit 1222, a cooperation service request unit 1223, and a searchable PDF generating unit 1224.

The display control unit 1221, the scan command unit 1222, and the cooperation service request unit 1223 are the same as the display control unit 521, the scan command unit 522, and the cooperation service request unit 523 of the first embodiment.

The searchable PDF generating unit 1224 is an additional function that uses OCR character recognition technology on a scanned image after scan execution in the scan execution unit 1211 to automatically extract character information and include this character information in a PDF. In addition, the searchable PDF generating unit 1224 is an additional function, and is therefore not necessarily limited to existing on the MFP 110, and is also able to be added later.

In addition to the function of the scan execution unit 511 in the First Embodiment, when there is a request to generate a searchable PDF in the scan settings, the scan execution unit 1211 uses the additional function of the searchable PDF generating unit 1224 and generates this. The image data storage unit 1212 is the same as the image data storage unit 512 in the First Embodiment.

When an error occurs in the MFP 110 at the time of the execution of a scan in the scan execution unit 1211, the error display unit 1213 displays a message to that effect. The error display unit 1213 uses a QR code to provide an error message according to the error code, and a URL for a settings web page corresponding to this error if it is possible to resolve this error by changing the settings.

The settings unit 1214 performs settings relating to the MFP 110 such as management of functions to be installed on the additional function unit 1220, settings for the IP address for the MFP 110, time settings for the MFP 110, and the like. The settings screen access unit 1215 makes it possible to access a webpage on which the settings can be confirmed and changed based on the IP address and FQDN for the MFP 110 from a web browser of the mobile terminal 120 or a PC terminal.

When an error occurs in the MFP 110, the settings URL acquisition unit 1216 acquires a URL for a settings page according to this error code. The QR code generating unit 1217 generates a QR code from a URL. The error display unit 1213 displays the QR code that has been generated.

The MFP cooperation service 130 has a request control unit 1231, an image processing unit 1232, a data management unit 1233, a display control unit 1234, a cloud service access unit 1235, and a settings unit 1236.

The request control unit 1231 is on standby in a state in which it is able to receive requests from external apparatuses. Upon receiving a processing request, the request control unit 1231 appropriately sends a processing command to the image processing unit 1232, the data management unit 1233, the display control unit 1234, the cloud service access unit 1235, or the settings unit 1236 according to the request.

The image processing unit 1232, the data management unit 1233, the display control unit 1234, and the cloud service access unit 1235 are the same as the image processing unit 532, the data management unit 533, the display control unit 534, and the cloud service access unit 535 of the First Embodiment.

The settings unit 1236 performs scan settings, authorization settings, settings for the workflow for the series of processing performed between the MFP 110 and the MFP cooperation service 130, and the like. Changes to the settings can be performed from the web browser of the mobile terminal 120 or a PC terminal via the display control unit 1234.

<Flow for the Entirety of the Processing>

Figure 14:
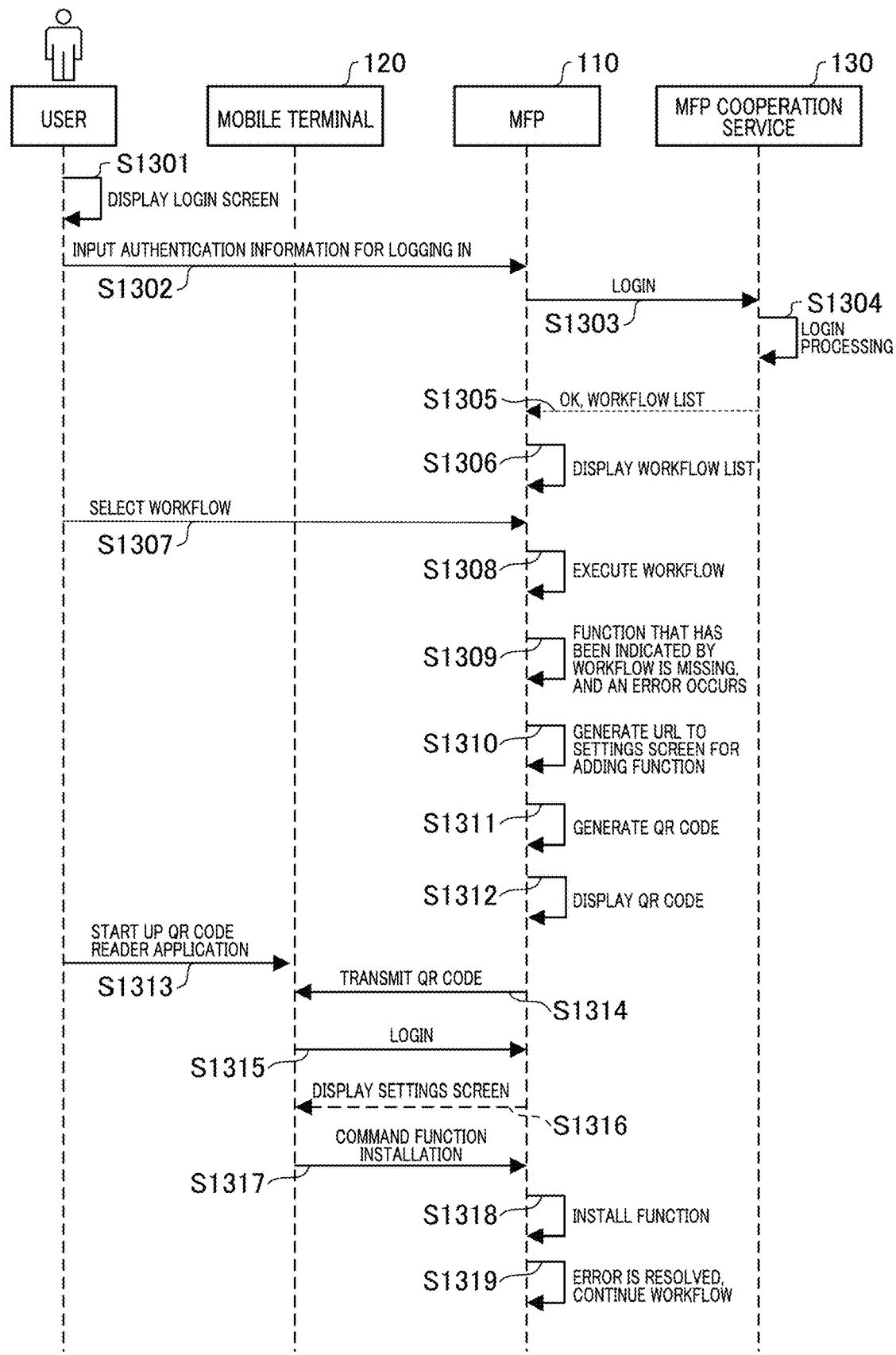
FIG. 14 is a sequence diagram for the entirety of the system according to the Second Embodiment.

FIG. 14 is a sequence diagram for the Second Embodiment. In the Second Embodiment, the workflow is made the series of processing of performing scanning on the MFP, generating a searchable PDF of the scanned image on the MFP, transmitting the generated PDF to the MFP cooperation service 130, and then afterward transmitting this to the cloud service 140. In addition, when this workflow is executed by the MFP 110, in a case in which the MFP 110 does not have a searchable PDF generating unit 1224 that generates searchable PDFs, an error will occur. In addition, in the case that this error occurs, the MFP 110 performs the installation of a searchable PDF generating unit 1224. In this context, an explanation will be given that focuses on the exchanges between each apparatus.

In a normal state, the MFP 110 displays a main screen on which buttons for executing each function provided by the MFP 110 are lined up on a touch panel.

By installing an additional application (referred to below as a workflow application) that executes a workflow that has been defined in advance on the MFP 110, a button for executing this workflow application is displayed on the main screen of the MFP 110. If a user pushes the button for executing this workflow application, a screen is displayed for executing the processing that is defined by this workflow on a scanned image, and the processing shown by the sequence in FIG. 14 is executed.

During step S1301, the workflow application displays a login screen on which authentication information is input in order to access the MFP cooperation service 130. During step S1302, the workflow application receives the input of the authentication information from the user. During step S1303, the workflow application transmits the authentication information that has been input by the user to the MFP cooperation service 130. During step S1304, the MFP cooperation service 130 verifies whether the username and password that are included in the login request are correct, and if they are correct, returns an access token to the MFP 110. This access token is sent along with a request for all of the subsequent requests for each type of request that is performed to the MFP cooperation service 130 from the MFP 110, and it is possible to specify the user that is the processing target from this information. The method for the user authentication is generally performed using a well-known method (basic authentication, digest authentication, authorization using OAuth, or the like).

After the login processing has been completed, during step S1305, the MFP 110 receives a login successful message and a list of workflows that have been defined in advance in the MFP cooperation service 130 from the MFP cooperation service 130. During step S1306, the MFP 110 displays the workflow list. During step S1307, the MFP 110 receives a selection of a button corresponding to a workflow that the user would like to execute from the user.

During step S1308, the MFP 110 executes the processing for the defined workflow. In the present embodiment, the MFP 110 first executes scanning. Next, it is assumed that the MFP 110 will attempt to execute the searchable PDF generation processing. However, in this context, it is assumed that the function for generating a searchable PDF has not been installed. Therefore, during step S1309, the function that has been indicated by the workflow is not installed on the MFP 110, and an error occurs. The processing during step S1309 is one example of an error detection unit configured to detect an error while processing is being executed for an image processing apparatus.

During step S1310, the MFP 110 generates a URL for a settings webpage for performing the addition of a function. The MFP 110 outputs an error code corresponding to when the function to be executed by the workflow is not present, and the settings URL acquisition unit 1216 acquires the URL for the webpage for adding the function that will be used in the workflow for the settings unit 1214 based on this error code.

For example, the settings URL acquisition unit 1216 acquires a URL such as "https://192.168.0.254/settings/extensions/". In this example, this is a URL for a webpage for performing the settings for adding a function to the MFP 110. The local IP address for the MFP 110 that is used within the LAN is "192.128.0.254", and the pass for the settings webpage for adding a function is "settings/extensions/". Although it is not disclosed in this example, a port number for the connection destination may also be included in the URL. In addition, in the same manner as in the First Embodiment, query parameters may also be added to the URL so that the user can easily perform settings.

During step S1311, the QR code generating unit 1217 generates a QR code from the URL that was generated during step S1310. The processing for step S1310 and step S1311 is one example of a URL information generating unit configured to generate URL information for a webpage for performing changes to settings related to an error.

During step S1312, the MFP 110 displays the QR code that was generated during step S1311 on the screen. At this time, the MFP 110 also displays an error message corresponding to the error code together with this QR code. The processing for step S1312 is one example of a URL information provision unit configured to provide URL information to an information processing unit.

Figure 15:
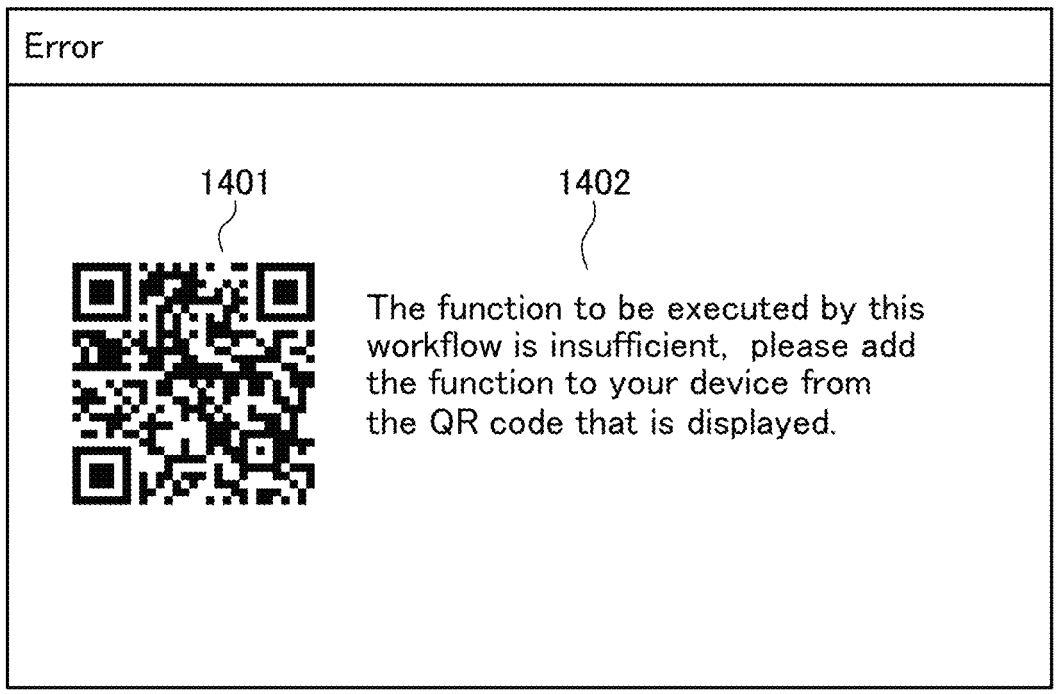
FIG. 15 is one example of a provision method to a mobile terminal of URL information for a settings web page in the Second Embodiment.

FIG. 15 is one example of an error screen that is displayed during step S1312. This error screen displays a QR code 1401 and an error message 1402. The QR code 1401 is the QR code that was generated, and the error message 1402 is the error message corresponding to the error code.

During step S1313, the mobile terminal 120 receives a user operation and starts up the QR reader application 321. The user reads the QR code 1401 that was displayed on the MFP 110 during step S1323 using the QR reader application 321 of the mobile terminal 120. During step S1314, the QR reader application 321 reads the QR code 1401 that is displayed on the MFP 110 and acquires the URL information.

During step S1315, the mobile terminal 120 uses the web browser application 320 and accesses the settings page, which is the page that is indicated by the URL that was acquired by the QR reader application 321 during step S1314. The web browser application 320 accesses the settings page via the setting screen access unit 125 of the MFP 110. At this time, authentication is necessary in order to access the MFP 110, and therefore, the mobile terminal 120 inputs the user ID and password and logs in.

Figure 16:
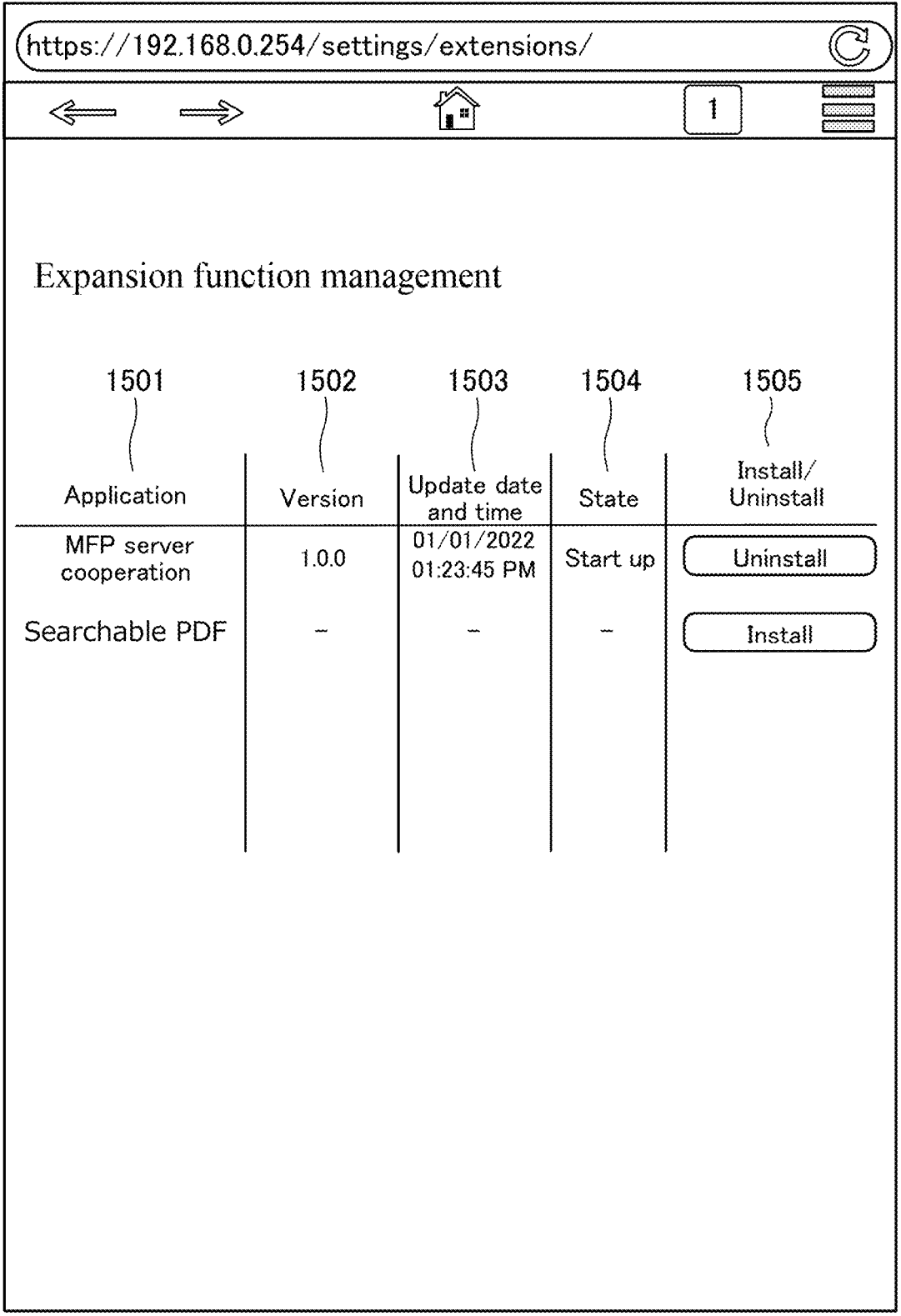
FIG. 16 is one example of a settings web page in the Second Embodiment.

During step S1316, the MFP 110 displays the settings screen for adding a function on the mobile terminal 120. FIG. 16 is one example of a settings web page that is a settings screen for adding a function. This settings web page displays an application name display 1501, a version display 1502, an update date and time display 1503, a state display 1504, and an install/uninstall button 1505.

The application name display 1501 displays the application name for the additional function. The application name display 1501 may display all of the applications that are available to the MFP 110, or the applications to be added to the display list may also be selected by the user in advance and displayed.

The version display 1502 displays the version of the application that is installed. In addition, in the case of an application that has not yet been installed, it may also display hyphens, a blank space, the latest version that is available, or the like.

The update date and time display 1503 displays the date and time at which the application was updated. In addition, in the case of an application that has not yet been installed, a hyphen, a blank space, or the like may also be displayed.

The state display 1504 displays if the application is currently starting up on the MFP 110 or if it has been stopped. The state display 1504 may also display a hyphen, or display a blank space or the like in the case of an application that has not yet been installed.

The install/uninstall button 1505 can install or uninstall an application by being pressed by the user. The install/uninstall button 1505 displays the word uninstall in a case in which this application has already been installed, and displays the word install in a case in which this application has not yet been installed.

During step S1317, the mobile terminal 120 receives that the install/uninstall button 1505, which had displayed the word install, has been pressed by the user, and transmits an install command for this application to the MFP 110. In this context, it is assumed that the user has pressed the install/uninstall button 1505 for the application name Searchable PDF that is shown in FIG. 16.

During step S1318, the MFP 110 installs the application for which the install command was received from the mobile terminal 120. In this context, the MFP 110 installs a function that generates a searchable PDF. In addition, in this case, processing may also be added such as the input of a license code for installing the searchable PDF generating function, purchase procedures, or the like. The processing from step S1315 to step S1318 is one example of a setting changing unit configured to access a webpage on an information processing apparatus from a URL and change settings related to an error.

During step S1319, the MFP 110 resolves the error by installing the searchable PDF generating function, and continues the workflow that was interrupted.

In this manner, the present embodiment is not limited to the settings for the server side from the First Embodiment, and it is possible to also perform changes to settings for the MFP itself by using the mobile terminal 120.

In addition, although in the present embodiment an explanation has been given using an example in which a function is installed that was insufficient at the time of the execution of a workflow, the present invention is not limited to the installation of a function, and it may also be made such that when an error occurs in the MFP, it is possible to change each type of setting from the mobile terminal by displaying a QR code on the MFP.

Third Embodiment

In the First Embodiment and the Second Embodiment, an explanation has been given with respect to changing the settings for one of the MFP cooperation service or the MFP itself using the mobile terminal. However, the present invention is not limited thereto, and it may also be made such that the settings for both the MFP cooperation service and the MFP can be changed from the mobile terminal according to necessity.

For example, it is assumed that in the same manner as in the Second Embodiment, a workflow is being executed in which a scan is performed on the MFP, a Searchable PDF is generated from the scanned image, and this is then transmitted to a cloud service. However, it is also thought that there may be cases in which the generation of the searchable PDF is not just executed on the MFP, and the searchable PDF is generated by performing image processing on the service that cooperates with the MFP. At such a time, it is thought that errors may occur in which neither of the MFP or the MFP cooperation service are able to generate a searchable PDF. As a case in which this cannot be generated on the MFP, a case is imagined in which the additional function has not been installed on the MFP. As another case in which this cannot be generated on the MFP, a case is imagined in which an MFP must be a high-performance device in order to use this function, and this cannot be used on a portion of devices. As a case in which this cannot be generated on the MFP cooperation service, a case is imagined in which in order to use this function, licenses must be granted at the unit of the MFP, which is the transmission source, and this cannot be generated because a license has not been granted to the MFP.

In such cases, cases are imagines in which it is possible to handle the error by changing the settings for either of the separate devices of the MFP or the MFP cooperation service. In the Third Embodiment, when there are multiple unit for solving an error that has occurred, the device for which the settings will be changed is selected according to the situation.

In addition, the system configuration for the Third Embodiment, as well as the hardware configurations for the MFP, the mobile terminal, and the MFP cooperation service are the same as in the First Embodiment and the Second Embodiment.

<Software Configuration for the Information Processing System>

Figure 17:
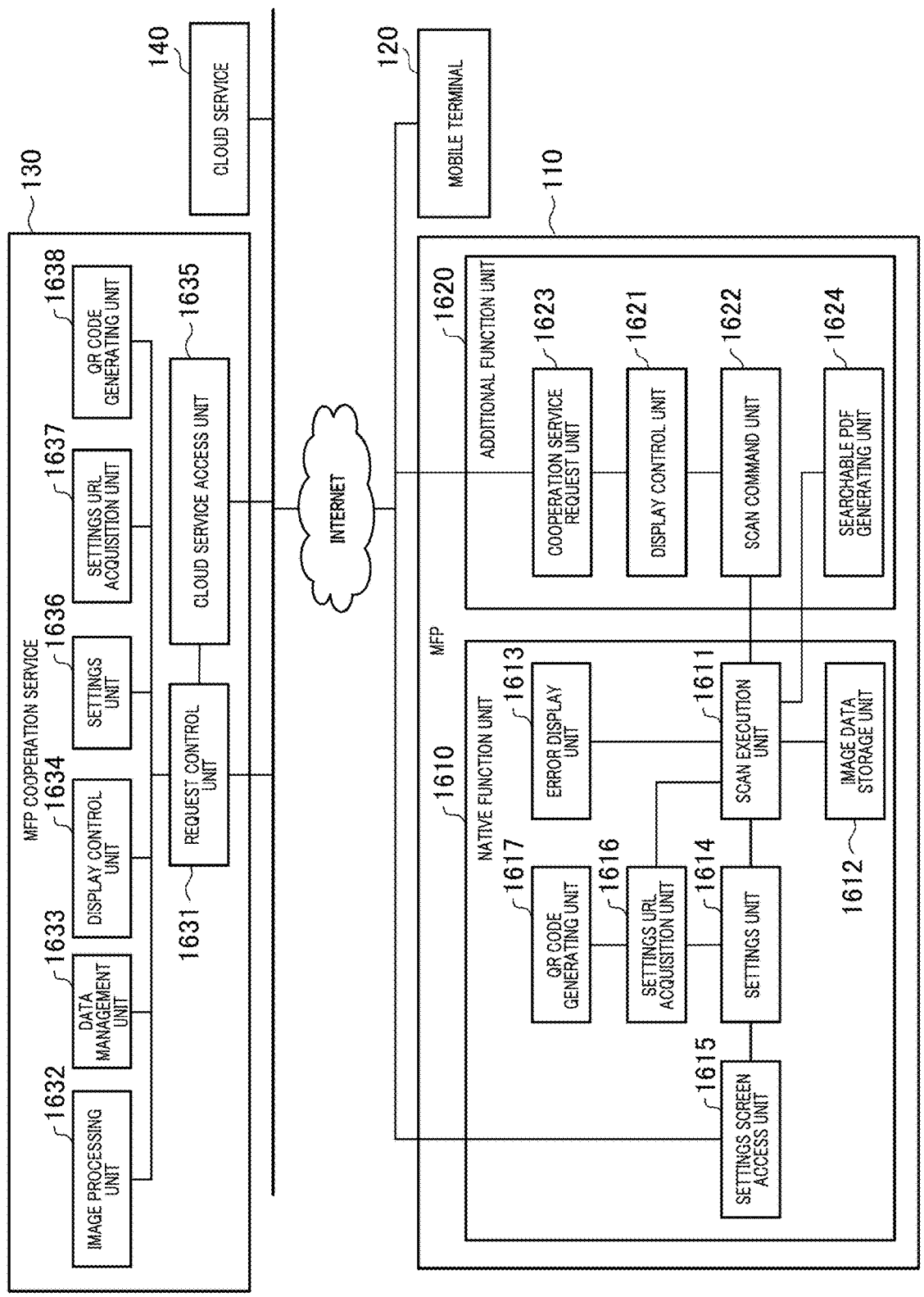
FIG. 17 is a software configuration diagram for a system according to a Third Embodiment.

FIG. 17 is a software configuration diagram for an information processing system according to the Third Embodiment. The MFP 110 can be largely divided into the two units of a native function unit 1610, and an additional function unit 1620 in the same manner as the native function unit 1210 and the additional function unit 1220 of the Second Embodiment.

The native function unit 1610 has a scan execution unit 1611, an image data storage unit 1612, an error display unit 1613, a settings unit 1614, a settings screen access unit 1615, a settings URL acquisition unit 1616, and a QR code generating unit 1617. These are the same as the scan execution unit 1211, the image data storage unit 1212, the error display unit 1213, the settings unit 1214, the settings screen access unit 1215, the settings URL acquisition unit 1216, and the QR code generating unit 1217 of the Second Embodiment.

The additional function unit 1620 has a display control unit 1621, a scan command unit 1622, a cooperation service request unit 1623, and a searchable PDF generating unit 1624. These are the same as the display control unit 1221, the scan command unit 1222, the cooperation service request unit 1223, and the searchable PDF generating unit 1224 of the Second Embodiment.

The MFP cooperation service 130 has a request control unit 1631, an image processing unit 1632, a data management unit 1633, a display control unit 1634, a cloud service access unit 1635, a settings unit 1636, a settings URL acquisition unit 1637, and a QR code generating unit 1638. These are the same the request control unit 531, the image processing unit 532, the data management unit 533, the display control unit 534, the cloud service access unit 535, the settings unit 536, the settings URL acquisition unit 537, and the QR code generating unit 538 of the First Embodiment.

When the generation of a searchable PDF is performed on the MFP cooperation service 130, the searchable PDF is generated by the image processing unit 1632. In addition, it is assumed that the management of the presence or absence of a searchable PDF license is performed in the settings unit 1614, and when the license is valid, it is possible to generate a searchable PDF on the MFP cooperation service 130.

<Processing Flow>

Figure 18:
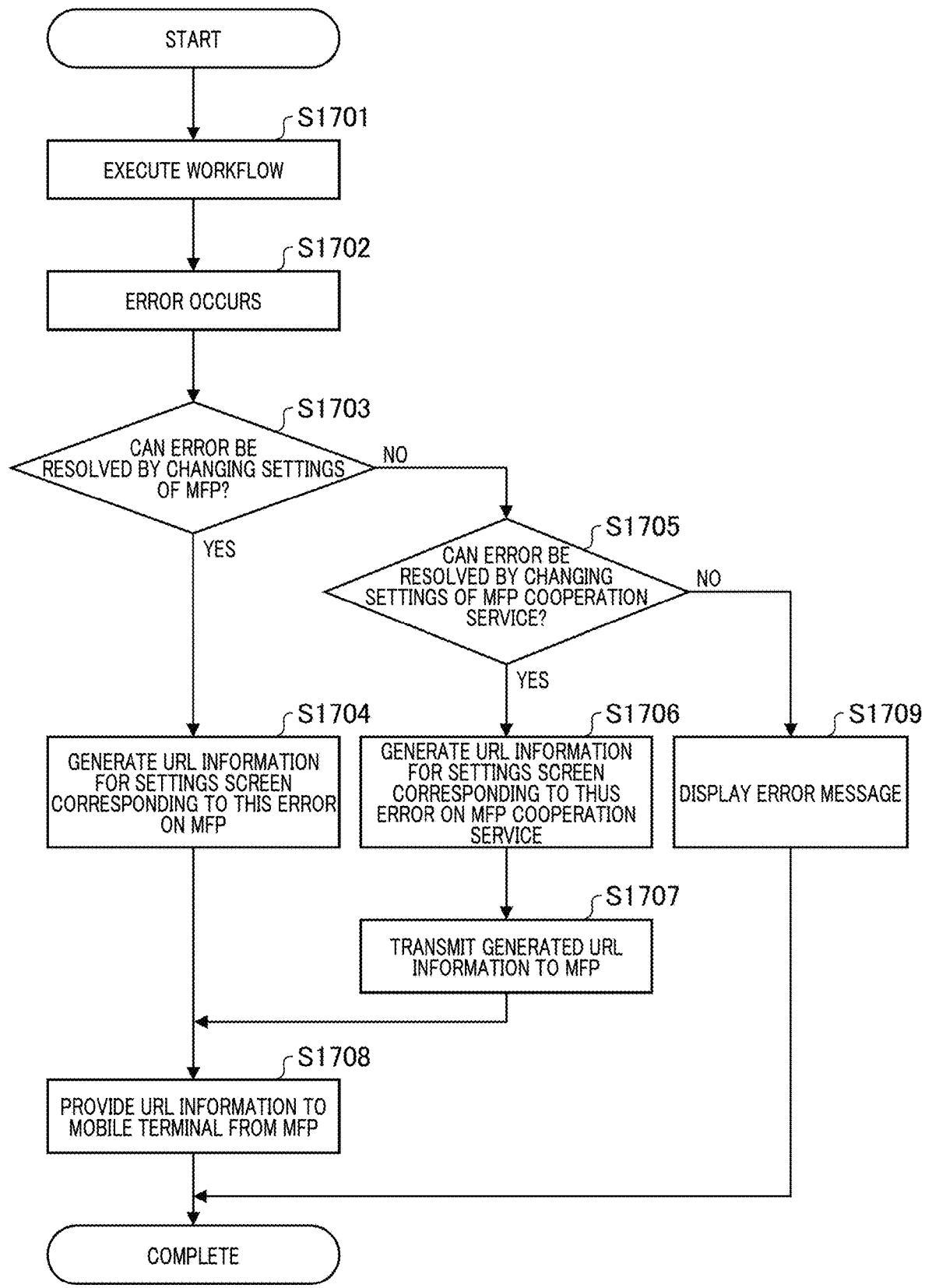
FIG. 18 is a flowchart for the processing for selecting the device for which the settings are to be changed when an error occurs in the Third Embodiment.

FIG. 18 is a flowchart for the processing for selecting a device for which to change the settings when an error occurs in the Third Embodiment.

During step S1701, the MFP 110 acquires the workflow from the MFP cooperation service 130, and executes the workflow. In the present embodiment, as the workflow, a scan is executed, and the generation of a searchable PDF is performed.

During step S1702, the MFP 110 is not able to generate a searchable PDF, and therefore an error occurs. The processing for step S1702 is one example of an error detection unit configured to detect an error while processing is being executed for an image processing apparatus. As the reason for why the searchable PDF cannot be generated on the MFP 110 side, there are cases in which although it is possible to install this function on the MFP 110, it has not been installed. As another reason for why the searchable PDF cannot be generated on the MFP 110 side, there are also cases in which the installation of the function on the MFP 110 itself is not possible. As a reason for why the searchable PDF cannot be generated on the MFP cooperation service 130 side, there are cases in which a license has not been allocated to the MFP 110 from the MFP cooperation service 130, and therefore, the function cannot be used. An error will occur in the MFP 110 in cases in which the searchable PDF cannot be generated in either of the MFP 110 or the MFP cooperation service 130 due to such reasons.

During step S1703, the MFP 110 confirms whether the error can be resolved by a change to the settings of installing an additional function on the MFP 110. There are cases in which, due to the device type of the MFP, the additional function for generating a searchable PDF cannot be installed, and in such a case, the processing proceeds to step S1705. In a case in which it is possible to install the additional function on the MFP 110, the processing proceeds to step S1704.

During step S1704, the MFP 110 generates a URL for the settings screen for the MFP 110 in relation to this error. In the present embodiment, the MFP 110 generates a URL for the settings screen for installing the function for generating a searchable PDF in the same manner as in the Second Embodiment. Then, the MFP 110 generates a QR code from the URL that has been generated. After this, the processing proceeds to step S1708. The processing for step S1704 is one example of a URL information generating unit configured to generate URL information for a webpage for performing changes to settings relating to an error.

During step S1705, the MFP 110 confirms whether the error can be resolved by changing the settings for the MFP cooperation service 130. In the present embodiment, in a case in which the number of licenses for searchable PDFs in the MFP cooperation service 130 that can be allocated is 0, the processing proceeds to step S1709. In a case in which there are licenses for searchable PDFs in the MFP cooperation service 130 that can be allocated, the processing proceeds to step S1706.

During step S1706, the MFP cooperation service 130 generates a URL for accessing a settings webpage that will allocate a license to an MFP of the MFP cooperation service 130, and generates a QR code from this URL. This processing is the same processing as the processing from step S612 of the First Embodiment, in which a URL for a webpage was generated for performing settings in order to be authorized by the cloud service 140. The processing for step S1706 is one example of a URL information generating unit that generates URL information for a webpage for performing changes to settings related to an error.

During step S1707, the MFP cooperation service 130 transmits the QR code that was generated during step S1706 to the MFP 110. After this, the processing proceeds to step S1708.

During step S1708, the MFP 110 displays the QR code that was generated during step S1704 or step S1707. The processing for step S1708 is one example of a URL information provision unit configured to provide URL information to an information processing apparatus. The user reads this QR code with the mobile terminal 120, and acquires the URL information. The user is thereby able to access the settings web page corresponding to the MFP 110 or the MFP cooperation service 130 from the mobile terminal 120, and it becomes possible to solve the error by making changes to the settings in the same manner as in the First Embodiment and the Second Embodiment. This processing is one example of a settings changing unit configured to access a webpage on an information processing apparatus from a URL and change settings relating to an error.

In addition, during step S1709, in a case in which the error cannot be dealt with by changing the settings of either of the MFP 110 or the MFP cooperation service 130, the MFP 110 will display only an error message. In the present embodiment, the MFP 110 displays a message that prompts the additional purchase of a license.

In addition, in the present embodiment, it has been made such that when there is no license to grant to a device, the processing proceeds to step S1709. However, the present invention is not limited thereto. For example, in a case in which it is possible to additionally purchase a license from the internet, during step S1705, the MFP cooperation service may also generate a URL that leads to a webpage for purchasing a license. It is possible to increase the usefulness to the user by having the MFP cooperation service 130 transmit the QR code for this URL to the MFP 110 and having this QR code be displayed on the MFP 110.

Due to the above explanation, in the present embodiment, it is possible to resolve an error by providing a webpage for changing the settings for either of the different devices of the MFP or the service that cooperates with the MFP to serve as a settings page that is appropriate according to the device type and the situation.

Note that in the present embodiment, an example has been explained in which a searchable PDF is generated. However, the present invention is not limited thereto, and it is possible to solve errors in the same manner as in the present embodiment as long as these errors can be resolved by changing the settings of either of the different devices.

Note that although in the present embodiment, during step S1703, a determination is first made as to whether it is possible to resolve the error by changing the settings of the MFP, the settings change confirmation for the MFP cooperation service of step S1705 may also be performed first. In addition, in a case in which the error can be solved by changing the settings of either, it may also be made such that after the user has rejected one of the unit for resolving the error, the other resolving unit is provided, and error resolution is performed using the latter.

OTHER EMBODIMENTS

The present invention can also be realized by processing in which a program that executes one or more of the functions of the above described-embodiments is provided to a system or apparatus via a network or storage medium, and one or more processors in the computer of this system or device reads out and executes the program. In addition, this may also be realized by a circuit (for example, an ASIC) that realizes one or more of these functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-198256, filed Dec. 12, 2022, which is hereby incorporated by reference herein in its entirety.

What is claimed is:

1. An information processing system including an image processing apparatus configured to perform processing on an image, and an information processing apparatus that is held by a user,
wherein the image processing apparatus comprises:
at least one memory that stores a program; and
at least one processor that executes the program to:
detect an error that occurs on an image processing function performed by the image processing apparatus, the error including errors relating to a program that is related to the image processing function not yet having been installed on the image processing apparatus; and
provide URL information for a webpage related to the detected error to the information processing apparatus,
wherein the webpage includes a setting screen for performing changes to settings, which include installing the program that is related to the image processing function, that caused the error, and
wherein the user holding the information processing apparatus accesses the webpage corresponding to the provided URL information on the information processing apparatus and changes the settings related to the error on the setting screen included in the webpage and displayed on the information processing apparatus to install the program.

2. The information processing system according to claim 1, wherein the at least one processor further executes the program to:
determine whether the error can be resolved by changing settings for any of a plurality of devices; and
generate the URL information for the webpage for changing the settings for a device from among the plurality of devices for which the error can be resolved by changing the settings of this device.

3. The information processing system according to claim 2, wherein the plurality of devices includes the image processing apparatus and the information processing apparatus.

4. The information system according to claim 1,
wherein the image processing apparatus performs the image processing function on the image received from an MFP, and
wherein the image processing apparatus provides the URL information to the information processing apparatus.

5. The information processing system according to claim 1, wherein the at least one processor further executes the program to generate the URL information if it is detected that the error occurs.

6. The information processing system according to claim 1, wherein the URL information is provided with a 2-dimensional code.

7. The information processing system according to claim 1, wherein the at least one processor further executes the program to:
provide a screen to allow the user to select a destination among a plurality of destinations for the image processed by the program installed in the image processing apparatus;
detect an error indicating that the image processing apparatus has no token or an invalid token to access the destination selected by the user; and
provide the information processing apparatus with URL information of a webpage for the user to request authorization for access to the selected destination,
wherein the token is issued by the selected destination based on the user holding the information processing apparatus accessing the webpage corresponding to the provided URL information on the information processing apparatus and inputting authentication information to acquire the authorization for access to the destination on a screen led from the webpage.

8. A non-transitory computer-readable storage medium configured to store a computer program for making at least one processor of an image processing apparatus to:
detect an error that occurs on an image processing function performed by the image processing apparatus, the error including errors relating to a program that is related to the image processing function not yet having been installed on the image processing apparatus; and
provide URL information for a webpage related to the detected error to the information processing apparatus,
wherein the webpage includes a setting screen for performing changes to settings, which include installing the program that is related to the image processing function, that caused the error, and
wherein the user holding the information processing apparatus accesses the webpage corresponding to the provided URL information on the information processing apparatus and changes the settings related to the error on the setting screen included in the webpage and displayed on the information processing apparatus to install the program.

9. An image processing apparatus comprising:
at least one memory that stores a program; and
at least one processor that executes the program to:
detect an error that occurs on an image processing function performed by the image processing apparatus, the error including errors relating to a program that is related to the image processing function not yet having been installed on the image processing apparatus; and
provide URL information for a webpage related to the detected error to the information processing apparatus,
wherein the webpage includes a setting screen for performing changes to settings, which include installing the program that is related to the image processing function, that caused the error, and
wherein the user holding the information processing apparatus accesses the webpage corresponding to the provided URL information on the information processing apparatus and changes the settings related to the error on the setting screen included in the webpage and displayed on the information processing apparatus to install the program.

* * * * *